United States Patent
Uehara et al.

(10) Patent No.: US 11,061,210 B2
(45) Date of Patent: Jul. 13, 2021

(54) VARIABLE MAGNIFICATION OPTICAL SYSTEM, OPTICAL DEVICE, AND MANUFACTURING METHOD FOR VARIABLE MAGNIFICATION OPTICAL SYSTEM

(71) Applicant: NIKON CORPORATION, Tokyo (JP)

(72) Inventors: Takeru Uehara, Ageo (JP); Takeshi Suzuki, Yokohama (JP); Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 591 days.

(21) Appl. No.: 15/576,827

(22) PCT Filed: May 26, 2016

(86) PCT No.: PCT/JP2016/065604
§ 371 (c)(1),
(2) Date: Mar. 13, 2018

(87) PCT Pub. No.: WO2016/194775
PCT Pub. Date: Dec. 8, 2016

(65) Prior Publication Data
US 2018/0307011 A1 Oct. 25, 2018

(30) Foreign Application Priority Data
May 29, 2015 (JP) .............................. JP2015-110080

(51) Int. Cl.
*G02B 15/177* (2006.01)
*G02B 13/18* (2006.01)
(Continued)

(52) U.S. Cl.
CPC ........... *G02B 15/177* (2013.01); *G02B 13/04* (2013.01); *G02B 13/18* (2013.01);
(Continued)

(58) Field of Classification Search
CPC .... G02B 27/646; G02B 15/173; G02B 15/14; G02B 15/177; G02B 7/08; G02B 15/16;
(Continued)

(56) References Cited

U.S. PATENT DOCUMENTS

| 5,585,970 A | 12/1996 | Shibayama |
| 2005/0013015 A1 | 1/2005 | Sensui |

(Continued)

FOREIGN PATENT DOCUMENTS

| CN | 1841112 A | 10/2006 |
| JP | 07-287168 A | 10/1995 |

(Continued)

OTHER PUBLICATIONS

International Search Report from International Patent Application No. PCT/JP2016/065604, dated Jul. 26, 2016.
(Continued)

*Primary Examiner* — Collin X Beatty
*Assistant Examiner* — Grant A Gagnon
(74) *Attorney, Agent, or Firm* — SGPatents PLLC

(57) ABSTRACT

A variable magnification optical system comprising, in order from an object side, a first lens group G1 having negative refractive power, a second lens group G2 having positive refractive power, a third lens group G3 having negative refractive power and a rear group comprising at least one lens group and having positive refractive power as a whole; upon varying magnification, air intervals between the neighboring lens groups being varied; and said first lens group G1 consisting of lens component(s) having negative refractive power, thereby a variable magnification optical system having excellent optical performance, an optical apparatus and a method for manufacturing the variable magnification optical system, being provided.

24 Claims, 26 Drawing Sheets

(51) Int. Cl.
  *G02B 27/64* (2006.01)
  *G02B 13/04* (2006.01)
  *G02B 15/14* (2006.01)
  *G02B 15/20* (2006.01)

(52) U.S. Cl.
  CPC ......... *G02B 15/1465* (2019.08); *G02B 15/20* (2013.01); *G02B 27/646* (2013.01)

(58) Field of Classification Search
  CPC .......... G02B 15/22; G02B 7/09; G02B 13/18; G02B 13/009; G02B 27/64; G02B 7/04; G02B 13/02; G02B 15/20; G02B 13/0015; G02B 13/0045; G02B 15/15; G02B 27/0025; G02B 15/167; G02B 15/17; G02B 9/62; G02B 9/64; G02B 13/001; G02B 13/04; G02B 15/163; G02B 7/023; G02B 7/102; G02B 13/0065; G02B 15/10; G02B 23/02; G02B 7/02; G02B 7/022; G02B 7/14; G02B 9/00; G02B 9/04; G02B 9/34; G02B 9/60; G02B 13/002; G02B 13/004; G02B 13/06; G02B 13/16; G02B 15/12; G02B 15/142; G02B 17/08; G02B 17/0804; G02B 17/0808; G02B 17/0896; G02B 21/26; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/24
  USPC ........................................................ 359/557
  See application file for complete search history.

(56) References Cited

U.S. PATENT DOCUMENTS

| | | |
|---|---|---|
| 2006/0221461 A1 | 10/2006 | Shibayama |
| 2007/0053069 A1 | 3/2007 | Yagyu et al. |
| 2009/0225438 A1 | 9/2009 | Kubota |
| 2013/0016433 A1 | 1/2013 | Ozaki et al. |
| 2014/0036137 A1 | 2/2014 | Inoue |
| 2015/0109485 A1 | 4/2015 | Ozaki et al. |

FOREIGN PATENT DOCUMENTS

| | | |
|---|---|---|
| JP | 2001-249275 A | 9/2001 |
| JP | 2004-246043 A | 9/2004 |
| JP | 2005-049843 A | 2/2005 |
| JP | 2006-301393 A | 11/2006 |
| JP | 2007-072263 A | 3/2007 |
| JP | 2007-094169 A | 4/2007 |
| JP | 2007-193173 A | 8/2007 |
| JP | 2008-052174 A | 3/2008 |
| JP | 2009-199092 A | 9/2009 |
| JP | 2009-216941 A | 9/2009 |
| JP | 2010-243636 A | 10/2010 |
| JP | 2011-069962 A | 4/2011 |
| JP | 2012-063661 A | 3/2012 |
| JP | 2014-032358 A | 2/2014 |
| JP | 2015-079229 A | 4/2015 |
| JP | 2015-222333 A | 12/2015 |
| WO | WO 2011/062076 A1 | 5/2011 |

OTHER PUBLICATIONS

Office Action dated Sep. 3, 2019, in Japanese Patent Application No. 2017-521882.
Office Action dated Jun. 23, 2020, in Chinese Patent Application No. 201680043970.7.

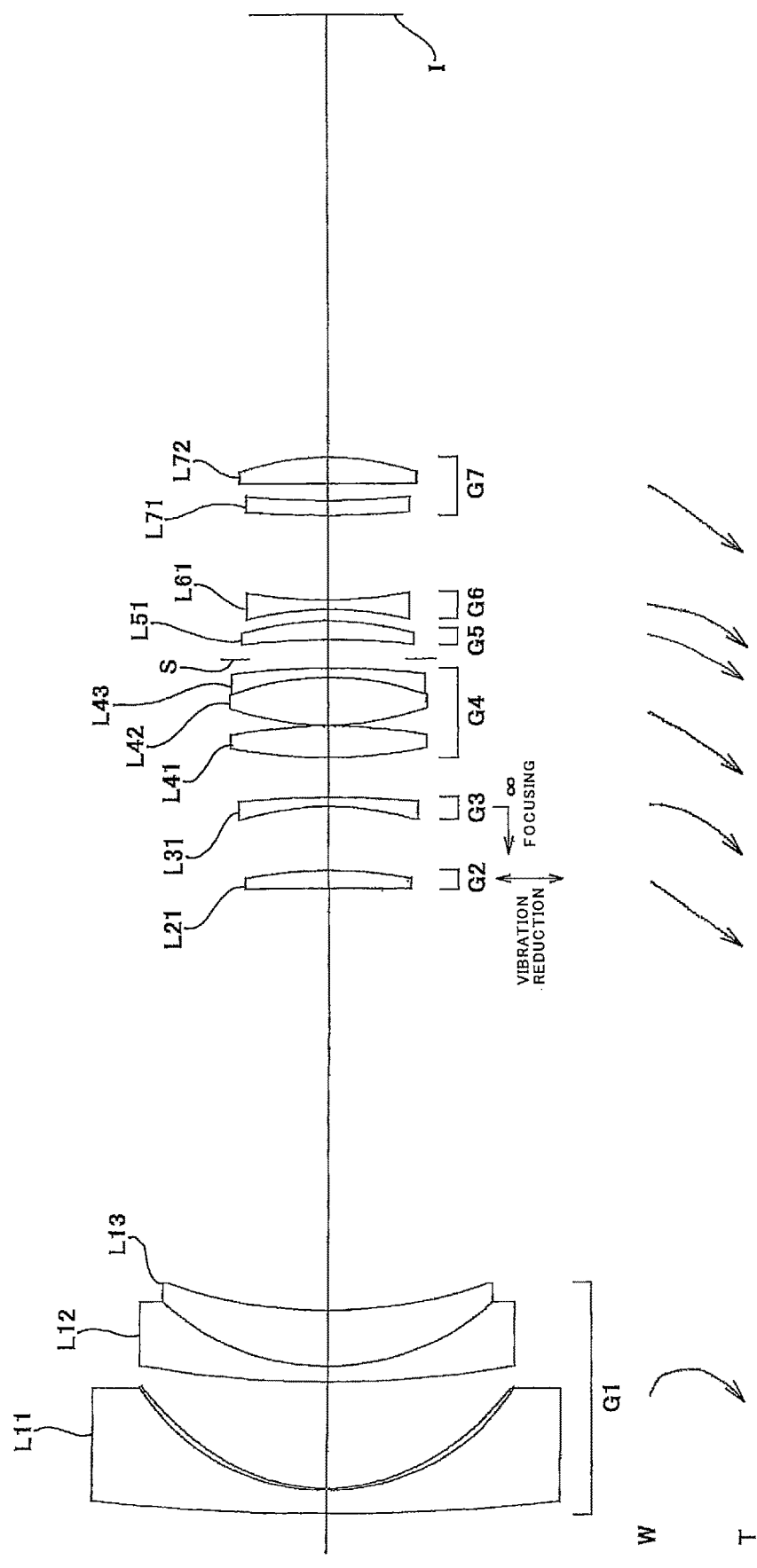

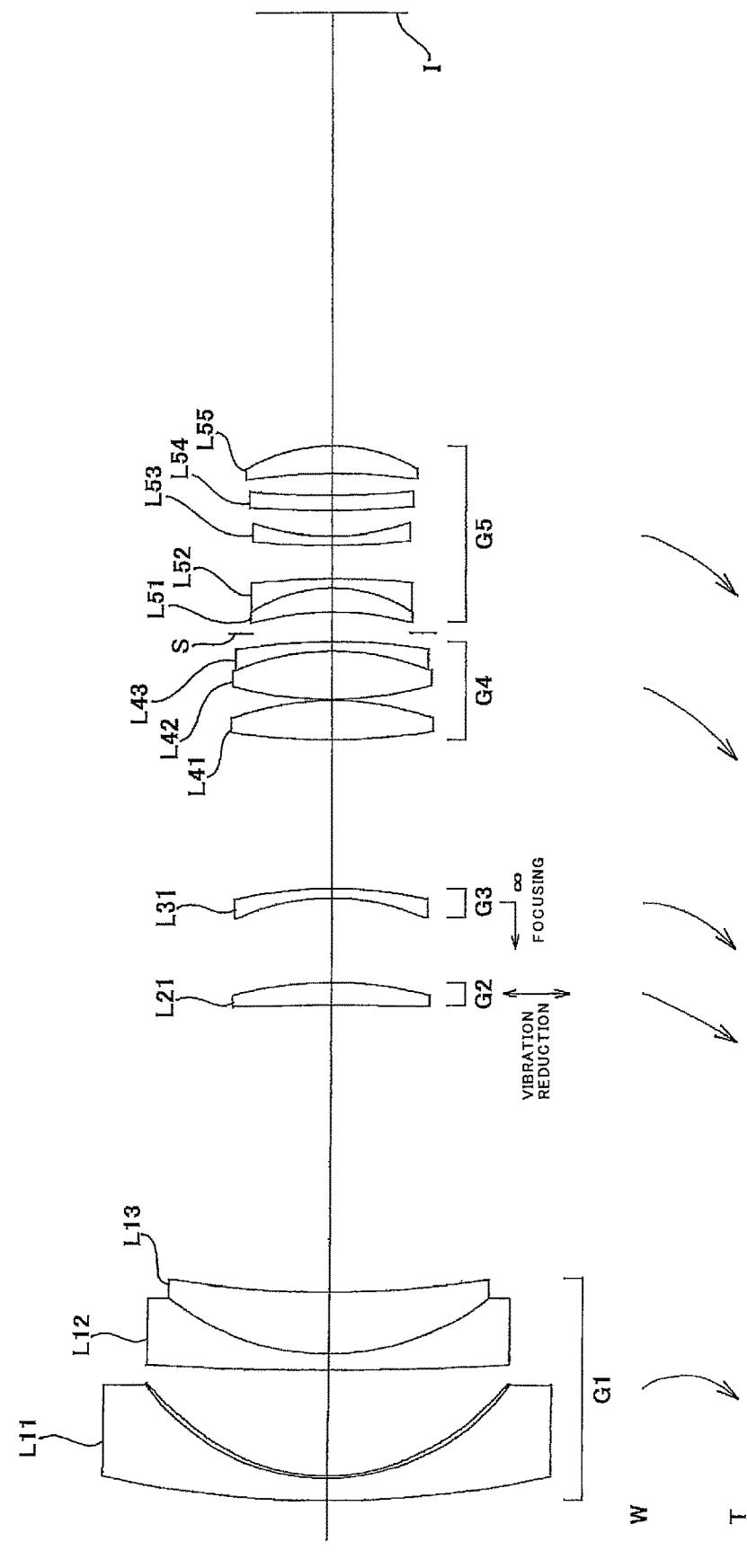

US 11,061,210 B2

VARIABLE MAGNIFICATION OPTICAL SYSTEM, OPTICAL DEVICE, AND MANUFACTURING METHOD FOR VARIABLE MAGNIFICATION OPTICAL SYSTEM

TECHNICAL FIELD

The present invention relates to a variable magnification optical system, an optical device and a manufacturing method for the variable magnification optical system.

BACKGROUND ART

There has been proposed a variable magnification optical system that is suitable to be used for a photographic camera, an electronic still camera, a video camera or the like. For example, there is a Patent Document 1. However, there has been a problem that the conventional variable magnification optical system as disclosed in the Patent Document 1 has not sufficient optical performance.

PRIOR ART REFERENCE

Patent Document

Patent Document 1: Japanese Patent application Laid-Open Gazette No. 2014-32358.

SUMMARY OF THE INVENTION

According to a first aspect of the present invention, there is provided a variable magnification optical system comprising, in order from an object side, a first lens group having negative refractive power, a second lens group having positive refractive power, a third lens group having negative refractive power, and a rear group comprising at least one lens group and having positive refractive power as a whole;
 upon varying magnification, air intervals between the neighboring lens groups being varied; and
 said first lens group consisting of a lens component(s) having negative refractive power.

According to a second aspect of the present invention, there is provided a method for manufacturing a variable magnification optical system comprising, in order from an object side, a first lens group having negative refractive power, a second lens group having positive refractive power, a third lens group having negative refractive power, and a rear group comprising at least one lens group and having positive refractive power as a whole; the method comprising the steps of:
 arranging such that, upon varying magnification, air intervals between the neighboring lens groups being varied; and
 arranging such that said first lens group consists of a lens component (s) having negative refractive power.

BRIEF DESCRIPTION OF THE DRAWINGS

FIGS. 2A, 2B and 2C are graphs showing various aberrations of the variable magnification optical system according to the First Example, upon focusing on an infinite distance object, in which FIG. 2A shows various aberrations in the wide-angle end state, FIG. 2B shows various aberrations in an intermediate focal length state, and FIG. 2C shows various aberrations in a telephoto end state.

FIG. 3 is a sectional view showing a lens configuration of a variable magnification optical system in a wide angle end state according to a Second Example.

FIGS. 4A, 4B and 4C are graphs showing various aberrations of the variable magnification optical system according to the Second Example, upon focusing on an infinite distance object, in which FIG. 4A shows various aberrations in the wide-angle end state, FIG. 4B shows various aberrations in an intermediate focal length state, and FIG. 4C shows various aberrations in a telephoto end state.

FIGS. 6A, 6B and 6C are graphs showing various aberrations of the variable magnification optical system according to the Third Example, upon focusing on an infinite distance object, in which FIG. 6A shows various aberrations in a wide-angle end state, FIG. 6B shows various aberrations in an intermediate focal length state, and FIG. 6C shows various aberrations in a telephoto end state.

FIG. 7 is a sectional view showing a lens configuration of a variable magnification optical system in a wide angle end state according to a Fourth Example.

FIGS. 8A, 8B and 8C are graphs showing various aberrations of the variable magnification optical system according to the Fourth Example, upon focusing on an infinite distance object, in which FIG. 8A shows various aberrations in a wide-angle end state, FIG. 8B shows various aberrations in an intermediate focal length state, and FIG. 8C shows various aberrations in a telephoto end state.

FIGS. 10A, 10B and 10C are graphs showing various aberrations of the variable magnification optical system according to the Fifth Example, upon focusing on an infinite distance object, in which FIG. 10A shows various aberrations in the wide-angle end state, FIG. 10B shows various aberrations in an intermediate focal length state, and FIG. 10C shows various aberrations in a telephoto end state.

FIGS. 12A, 12B and 12C are graphs showing various aberrations of the variable magnification optical system according to the Sixth Example, upon focusing on an infinite distance object, in which FIG. 12A shows various aberrations in the wide-angle end state, FIG. 12B shows various aberrations in an intermediate focal length state, and FIG. 12C shows various aberrations in a telephoto end state.

FIGS. 14A, 14B and 14C are graphs showing various aberrations of the variable magnification optical system according to the Seventh Example, upon focusing on an infinite distance object, in which FIG. 14A shows various aberrations in the wide-angle end state, FIG. 14B shows various aberrations in an intermediate focal length state, and FIG. 14C shows various aberrations in a telephoto end state.

FIGS. 16A, 16B and 16C are graphs showing various aberrations of the variable magnification optical system according to the Eighth Example, upon focusing on an infinite distance object, in which FIG. 16A shows various aberrations in the wide-angle end state, FIG. 16B shows various aberrations in an intermediate focal length state, and FIG. 16C shows various aberrations in a telephoto end state.

FIGS. 18A, 18B and 18C are graphs showing various aberrations of the variable magnification optical system according to the Ninth Example, upon focusing on an infinite distance object, in which FIG. 18A shows various aberrations in the wide-angle end state, FIG. 18B shows various aberrations in an intermediate focal length state, and FIG. 18C shows various aberrations in a telephoto end state.

FIGS. 20A, 20B and 20C are graphs showing various aberrations of the variable magnification optical system according to the Tenth Example, upon focusing on an infinite distance object, in which FIG. 20A shows various aberrations in the wide-angle end state, FIG. 20B shows various aberrations in an intermediate focal length state, and FIG. 20C shows various aberrations in a telephoto end state.

FIGS. 22A, 22B and 22C are graphs showing various aberrations of the variable magnification optical system according to the Eleventh Example, upon focusing on an infinite distance object, in which FIG. 22A shows various aberrations in the wide-angle end state, FIG. 22B shows various aberrations in an intermediate focal length state, and FIG. 22C shows various aberrations in a telephoto end state.

FIGS. 24A, 24B and 24C are graphs showing various aberrations of the variable magnification optical system according to the Twelfth Example, upon focusing on an infinite distance object, in which FIG. 24A shows various aberrations in the wide-angle end state, FIG. 24B shows various aberrations in an intermediate focal length state, and FIG. 24C shows various aberrations in a telephoto end state.

EMBODIMENTS FOR CARRYING OUT THE INVENTION

Figure 1:
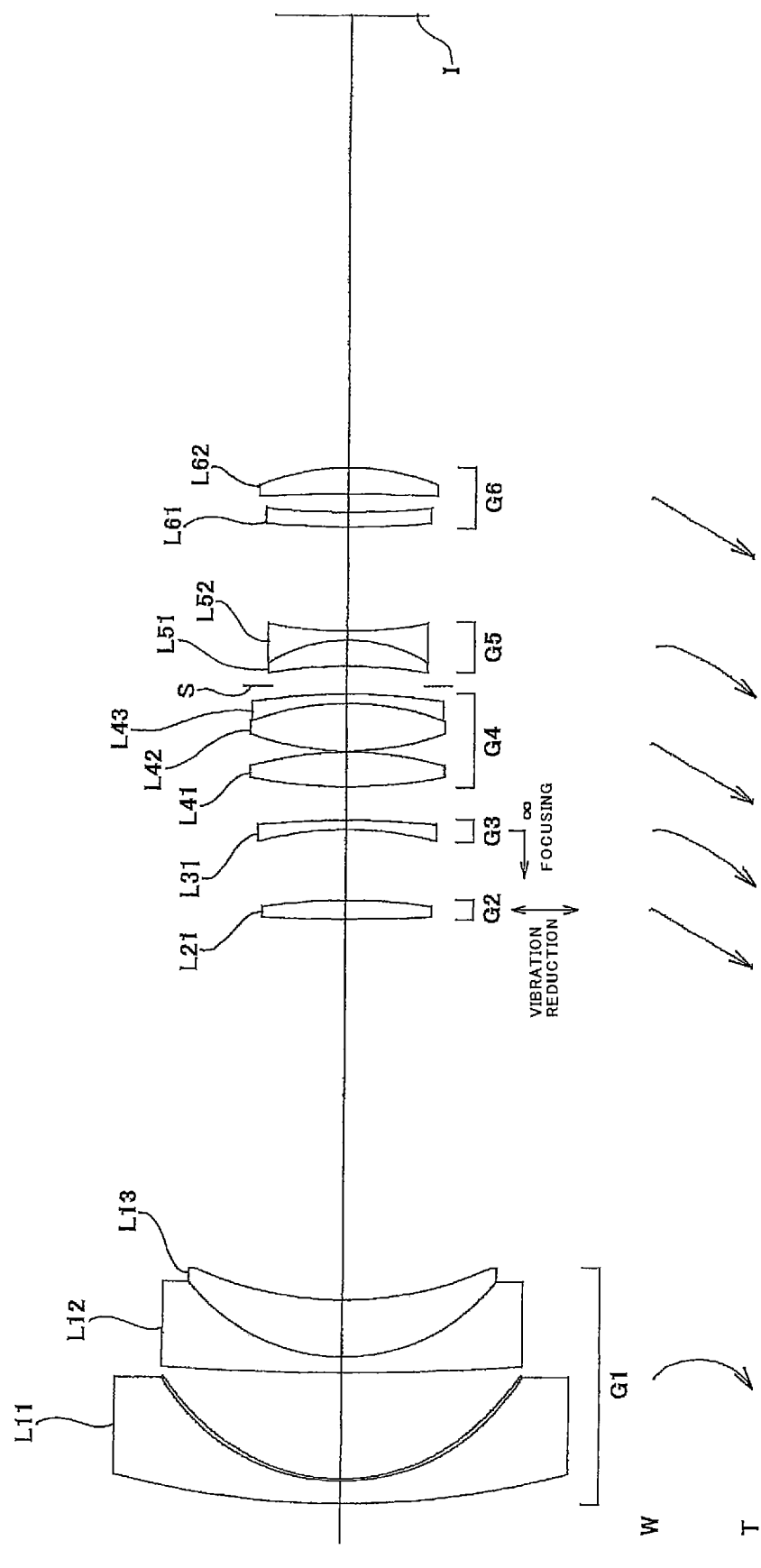
FIG. 1 is a sectional view showing a lens configuration of a variable magnification optical system in a wide angle end state according to a First Example.

Next, a variable magnification optical system according to an embodiment of the present application, an optical apparatus and a method for manufacturing the variable magnification optical system, will be explained.

The variable magnification optical system according to the present embodiment comprises, in order from an object side, a first lens group having negative refractive power, a second lens group having positive refractive power, a third lens group having negative refractive power, and a rear group comprising at least one lens group and having positive refractive power;

upon varying magnification, air intervals between the neighboring lens groups being varied; and said first lens group consisting of lens component(s) having negative refractive power.

In the variable magnification optical system according to the present embodiment, the first lens group consists of lens component(s) having negative refractive power. With such a configuration, it is possible to correct superbly lateral chromatic aberration. Meanwhile, in order to correct lateral chromatic aberration more superbly, it is more preferable that at least one surface of the lens component(s) having negative refractive power is an aspherical surface. Further, taking manufacturing into consideration, it is more preferable that image side surface of a meniscus shaped negative lens component having a convex surface facing to the object side is aspherical surface. Since it is not necessary to dispose any positive lens component in the first lens group, it is possible to reduce the number of lenses. Furthermore, it is not necessary to dispose any positive lens component having large diameter at the most object side in the first lens group, so diameter of a lens disposed at the most object side in the first lens group may be made small. Accordingly, the variable magnification optical system according to the present embodiment, may be made compact and light in weight. Incidentally, the term "lens component" in this specification, means a single lens or a cemented lens.

By above described configuration, it is possible to realize the variable magnification optical system having superb optical performance.

In the variable magnification optical system according to the present embodiment, it is preferable that the first lens group comprises at least one negative lens and at least one positive lens, and that the following conditional expression (1) is satisfied:

$$0.68 < (-fn)/fp < 1.00 \tag{1}$$

where fn denotes a focal length of a most image side negative lens in the first lens group, and fp denotes a focal length of a most image side positive lens in the first lens group.

The conditional expression (1) defines the focal length of the most image side positive lens in the first lens group relative to the focal length of the most image side negative lens in the first lens group. With satisfying the conditional expression (1), the variable magnification optical system according to the present embodiment can correct superbly lateral chromatic aberration, curvature of field and spherical aberration at the telephoto end state, while making the optical system compact.

When the value of (−fn)/fp is equal to or falls below the lower limit of the conditional expression (1), the focal length of the most image side negative lens in the first lens group becomes small and the focal length of the most image side positive lens in the first lens group becomes large, and it becomes difficult to correct lateral chromatic aberration and spherical aberration in the telephoto end state. Meanwhile, in order to ensure the advantageous effect of the present embodiment, it is preferable to set the lower limit value of the conditional expression (1) to 0.70.

On the other hand, when the value of (−fn)/fp is equal to or exceeds the upper limit value of the conditional expression (1), the focal length of the most image side negative lens in the first lens group becomes large and the focal length of the most image side positive lens in the first lens group becomes small. Accordingly, the entire length of the variable magnification optical system according to the present embodiment becomes large, and it becomes difficult to correct curvature of field. Meanwhile, in order to ensure the advantageous effect of the present embodiment, it is preferable to set the upper limit value of the conditional expression (1) to 0.90.

In the variable magnification optical system according to the present embodiment, it is preferable that the following conditional expression (2) is satisfied:

$$1.00 < fG1/f1 < 3.00 \qquad (2)$$

where fG1 denotes a focal length of a most object side lens component in the first lens group, and f1 denotes a focal length of the first lens group.

The conditional expression (2) defines refractive power of the most object side lens component in the first lens group. With satisfying the conditional expression (2), the variable magnification optical system according to the present embodiment can correct superbly curvature of field and spherical aberration in the telephoto end state, while making the optical system compact.

When the value of fG1/f1 is equal to or falls below the lower limit value of the conditional expression (2), the focal length of the most object side lens component in the first lens group becomes small and the focal length of the first lens group becomes large, and it becomes difficult to correct spherical aberration in the telephoto end state. Meanwhile, in order to ensure the advantageous effect of the present embodiment, it is preferable to set the lower limit value of the conditional expression (2) to 1.20.

On the other hand, when the value of fG1/f1 is equal to or exceeds the upper limit value of the conditional expression (2), the focal length of the most object side lens component in the first lens group becomes large and the focal length of the first lens group becomes small. Accordingly, the entire length of the variable magnification optical system according to the present embodiment becomes large, and it becomes difficult to correct curvature of field. Meanwhile, in order to ensure the advantageous effect of the present embodiment, it is preferable to set the upper limit value of the conditional expression (2) to 2.00.

In the variable magnification optical system according to the present embodiment, it is preferable that the following conditional expression (3) is satisfied:

$$0.60 < f2/(-f3) < 2.00 \qquad (3)$$

where f2 denotes a focal length of the second lens group, and f3 denotes a focal length of the third lens group.

The conditional expression (3) defines the focal length of the third lens group relative to the focal length of the second lens group. With satisfying the conditional expression (3), the variable magnification optical system according to the present embodiment can correct superbly spherical aberration in the telephoto end state and curvature of field in the wide angle end state, while making diameters of the first to the third lens groups small.

When the value of f2/(-f3) is equal to or falls below the lower limit value of the conditional expression (3), the focal length of the second lens group becomes small and the focal length of the third lens group becomes large, and it becomes difficult to correct spherical aberration in the telephoto end state. Meanwhile, in order to ensure the advantageous effect of the present embodiment, it is preferable to set the lower limit value of the conditional expression (3) to 0.70.

On the other hand, when the value of f2/(-f3) is equal to or exceeds the upper limit value of the conditional expression (3), the focal length of the second lens group becomes large and the focal length of the third lens group becomes small. Accordingly, diameters of the first to the third lens groups become large, and it becomes difficult to correct curvature of field in the wide angle end state. Meanwhile, in order to ensure the advantageous effect of the present embodiment, it is preferable to set the upper limit value of the conditional expression (3) to 1.90.

Further, in the variable magnification optical system according to the present embodiment, it is preferable that the first lens group consists of two or three lens components. With this configuration, it is possible to correct various aberrations, in particular, spherical aberration, curvature of field and distortion, and to make the variable magnification optical system according to the present embodiment compact.

Further, in the variable magnification optical system according to the embodiment, it is preferable that the first lens group comprises lens component which comprises at least one positive lens and one negative lens and has negative refractive power as a whole. With this configuration, it is possible to correct well various aberrations, in particular, spherical aberration curvature of field and distortion.

Further, in the variable magnification optical system according to the present embodiment, it is preferable that the first lens group consists of a first lens component having negative refractive power and a second lens component having negative refractive power. With this configuration, it is possible to reduce the number of lenses while securing a predetermined variable magnification ratio. Furthermore, it is possible to correct effectively curvature of field in the wide angle end state and spherical aberration in the telephoto end state.

Further, in the variable magnification optical system according to the present embodiment, it is preferable that the first lens group comprises a first lens component having negative refractive power and a second lens component having negative refractive power and the second lens component consists of a cemented lens constructed by a negative lens cemented with a positive lens.

Further, it is preferable that in the variable magnification optical system according to the present embodiment the first lens group comprises a first lens component having negative refractive power and a second lens component having negative refractive power and the first lens component is formed with an aspherical surface made of resin on an image side surface of a glass lens.

Further, in the variable magnification optical system according to the present embodiment, it is preferable that the following conditional expression is satisfied:

$$1.00 < fN/f1 < 3.00$$

where fN denotes a focal length of a negative lens component having largest negative refractive power in the first lens group, and f1 denotes a focal length of the first lens group.

Further, it is preferable that the variable magnification optical system according to the present embodiment consists of, in order from an object side, a first lens group having negative refractive power, a second lens group having positive refractive power, a third lens group having negative refractive power, and a fourth lens group having positive refractive power.

Further, it is preferable that the variable magnification optical system according to the present embodiment consists of, in order from an object side, a first lens group having negative refractive power, a second lens group having positive refractive power, a third lens group having negative refractive power, a fourth lens group having positive refractive power and a fifth lens group.

Further, it is preferable that the variable magnification optical system according to the present embodiment consists of, in order from an object side, a first lens group having negative refractive power, a second lens group having positive refractive power, a third lens group having negative refractive power, a fourth lens group having positive refractive power, a fifth lens group having negative refractive power, and a sixth lens group having positive refractive power.

Further, in the variable magnification optical system according to the present embodiment, it is preferable that the rear group includes three or more lens groups; upon varying magnification, air intervals between the neighboring lens groups included in the rear group are varied; and upon varying magnification, at least one of air intervals between the lens groups which are included in the rear group but not neighboring is not varied. In other words, it is preferable that the rear group comprises therein lens groups which are not neighboring but are moved as a body upon varying magnification.

Further, in the variable magnification optical system according to the present embodiment, it is preferable that at least one lens component in the second lens group is moved to have a component in a direction perpendicular to the optical axis. With such configuration, correction of image blur caused by camera shake, vibration or the like, in other words, vibration reduction can be conducted. Further, it is possible to correct effectively and efficiently variation in curvature of field upon varying magnification.

Further, in the variable magnification optical system according to the embodiment, it is preferable that lens groups contained in the rear group are two or more. With this configuration, a desired variable magnification ratio can be secured easily.

Further, in the variable magnification optical system according to the present embodiment, it is preferable that at least one of the first lens group and a most image side lens group is formed with an aspherical surface. With this configuration, coma aberration can be corrected.

Further, in the variable magnification optical system according to the present embodiment, it is preferable that lens component (s) in the first lens group is (are) formed with an aspherical surface(s). With this configuration, curvature of field in the wide angle end state and spherical aberration in the telephoto end state can be more efficiently corrected. In particular, it is preferable that in the variable magnification optical system according to the present embodiment, an image side lens surface of a most object side lens in the first lens group is an aspherical surface. With this configuration, distortion can be corrected and cost reduction can be attained while the optical system can be made compact. It is preferable that a most object side lens in the first lens group is a negative meniscus lens. With this configuration, diameter of the most object side lens can be decreased.

Further, in the variable magnification optical system according to the present embodiment, it is preferable that the first lens group has a cemented lens. With this configuration, it is possible to correct effectively coma aberration of each wavelength in the wide angle end state. Furthermore, it is preferable that the cemented lens as a whole has a meniscus shape convexed toward the object side or a double-concaved shape. It is preferable that the cemented lens consists of, in order from the object side, a negative lens and a positive lens. It is preferable that the negative lens in the cemented lens is meniscus-shaped. It is preferable that the positive lens in the cemented lens is meniscus-shaped. The more those conditions are satisfied by the cemented lens, the less aberrations are generated by the cemented lens, so high mounting accuracy is not required, thereby wastefulness upon manufacturing being obviated.

Further, in the variable magnification optical system according to the present embodiment, it is preferable that the fourth lens group comprises a single lens and a cemented lens. With this configuration, spherical aberration and longitudinal chromatic aberration can be corrected.

Further, in the variable magnification optical system according to the present embodiment, it is preferable that the most image side lens group includes a plastic lens(es). With this configuration, cost reduction can be attained. Further, plastic lens can be cost-effectively provided with aspherical surface(s), thereby coma aberration can be corrected well. Meanwhile, in a case where the variable magnification optical system according to the present embodiment is adopted as an interchangeable lens, the most image side lens thereof is apt to be easily touched by the user. Therefore, it is preferable that the most image side lens is a glass lens which is high in endurance in comparison with plastic lens.

The optical apparatus according to the present embodiment is equipped with the variable magnification optical system having the above described configuration, so it is possible to attain an optical apparatus having excellent optical performance.

Further, the method for manufacturing a variable magnification optical system according to the present embodiment is a method for manufacturing a variable magnification optical system which comprises, in order from an object side, a first lens group having negative refractive power, a second lens group having positive refractive power, a third lens group having negative refractive power, and a rear group comprising at least one lens group and having positive refractive power as a whole; the method comprising steps of:

configuring such that, upon varying magnification, air intervals between the neighboring lens groups are varied; and configuring such that said first lens group consists of a lens component(s) having negative refractive power(s).

With this configuration, a variable magnification optical system having excellent optical performance can be manufactured.

Hereinafter, variable magnification optical systems relating to numerical examples according to the present embodiment will be explained with reference to the accompanying drawings.

First Example

FIG. 1 is a sectional view showing a variable magnification optical system according to a First Example of the present embodiment in the wide angle end state. Incidentally, arrows in FIG. 1, and in FIG. 3, FIG. 5, FIG. 9, FIG. 11, FIG. 13, FIG. 15, FIG. 17, FIG. 19, FIG. 21 and FIG. 23 described hereinafter, show movement trajectories of the respective lens groups upon varying magnification from the wide angle end state (W) to the telephoto end state (T), of the variable magnification optical system according to the present embodiment.

The variable magnification optical system according to the present Example is composed of, in order from an object side, a first lens group G1 having negative refractive power, a second lens group G2 having positive refractive power, a third lens group G3 having negative refractive power, and a rear group having positive refractive power.

The rear group is composed of, in order from the object side, a fourth lens group G4 having positive refractive power, a fifth lens group G5 having negative refractive power, and a sixth lens group G6 having positive refractive power, and has positive refractive power in an entire zooming range. Meanwhile, an aperture stop S is disposed between the fourth lens group G4 and the fifth lens group G5.

The first lens group G1 is composed of, in order from the object side, a negative meniscus lens L11 having a convex surface facing the object side, a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a double convex positive lens L21.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a positive meniscus lens L61 having a convex surface facing the object side and a positive meniscus lens L62 having a concave surface facing the object side. Meanwhile, the positive meniscus lens L61 is a plastic lens, of which an image side lens surface is an aspherical surface.

In the variable magnification optical system according to the present Example, upon varying magnification from the wide angle end state to the telephoto end state, the first to the sixth lens groups G1-G6 are moved along the optical axis such that an air interval between the first lens group G1 and the second lens group G2, an air interval between the second lens group G2 and the third lens group G3, an air interval between the third lens group G3 and the fourth lens group G4, an air interval between the fourth lens group G4 and the fifth lens group G5, and an air interval between the fifth lens group G5 and the sixth lens group G6 are varied. More in detail, upon varying magnification, the second, the fourth and the sixth lens groups G2, G4 and G6 are moved in a body. Meanwhile, upon varying magnification, the aperture stop S is moved together with the fourth lens group G4 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 1 below shows various values of the variable magnification optical system according to the present Example.

In table 1, "f" denotes a focal length, and "BF" denotes a back focal length, in other words, a distance on the optical axis between the most object side lens surface and the image plane.

In [Surface Data], "m" denotes a surface number that is an order of a lens surface counted from the object side, "r" denotes a radius of curvature, "d" denotes a surface to surface distance, that is, an interval from an n-th surface to an (n+1)-th surface, where n is an integer, "nd" denotes refractive index for d-line (wavelength $\lambda$=587.6 nm) and "vd" denotes an Abbe number for d-line (wavelength $\lambda$=587.6 nm). Further, "OP" denotes an object surface, "variable" denotes a variable surface-to-surface distance, and "Stop S" denotes an aperture stop S. Meanwhile, radius of curvature r=∞ denotes a plane surface. In addition, an aspherical surface is expressed by attaching "*" to the surface number, and in the column of the radius of curvature "r", a paraxial radius of curvature is shown.

In [Aspherical Data], with respect to an aspherical surface shown in [Surface Data], an aspherical surface coefficient and a conical coefficient are shown in the case where the aspherical surface is exhibited by the following expression:

$$x=(h^2/r)/[1+\{1-\kappa(h/r)^2\}^{1/2}]+A4h^4+A6h^6+A8h^8$$

where "h" denotes a height in a direction perpendicular to the optical axis; "x" denotes a sag amount that is a distance in the direction of the optical axis from the tangent surface at the vertex of aspherical surface to the aspherical surface at the height "h"; "$\kappa$" denotes a conical coefficient; "A4", "A6", and "A8" denote respective aspherical coefficients, and "r" denotes a paraxial radius of curvature that is a radius of curvature of a reference sphere. "E-n", where n is an integer, denotes "×10$^{-n}$", for example, "1.23456E-07" denotes "1.23456×10$^{-7}$". Secondary aspherical surface coefficient "A2" is "0", and omitted.

In [Various Data], "FNO" denotes an F-number, "2ω" denotes an angle of view (unit "°"), "Y" denotes an image height, "TL" denotes a total length of the optical system according to the present Example, that is, a distance along the optical axis from the first surface of the lens surface to the image plane, "dn" denotes a variable distance between an n-th surface and an (n+1)-th surface, and "GRf" denotes a focal length of the rear group. In addition, "W" denotes a wide angle end state, "M" denotes an intermediate focal length state and "T" denotes a telephoto end state.

In [Lens Group Data], a starting surface and a focal length of each lens group are shown. "ST" denotes the starting surface and "f" denotes the focal length. In [Values for Conditional Expressions], values corresponding to respective conditional expressions of the variable magnification optical system according to the present Example, are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced, the unit is not necessarily to be limited to Incidentally, the explanation of reference symbols in Table 1 described above, is the same in Tables for the other Examples described later.

TABLE 1

First Example

[Surface Data]

| m | r | d | nd | νd |
|---|---|---|---|---|
| OP | ∞ | | | |
| 1 | 80.72 | 2.00 | 1.58913 | 61.22 |
| 2 | 18.88 | 0.17 | 1.56093 | 36.64 |
| *3 | 17.05 | 9.35 | 1.00000 | |
| 4 | 240.48 | 1.40 | 1.62299 | 58.12 |
| 5 | 17.63 | 5.00 | 1.84666 | 23.80 |
| 6 | 32.74 | variable | 1.00000 | |
| 7 | 164.19 | 1.65 | 1.48749 | 70.31 |
| 8 | −48.23 | variable | 1.00000 | |
| 9 | −30.49 | 0.80 | 1.77250 | 49.62 |
| 10 | −87.64 | variable | 1.00000 | |
| 11 | 46.43 | 3.05 | 1.48749 | 70.31 |
| 12 | −31.99 | 0.10 | 1.00000 | |
| 13 | 25.50 | 4.20 | 1.48749 | 70.31 |
| 14 | −25.50 | 0.80 | 1.84666 | 23.80 |
| 15 | −60.79 | 0.75 | 1.00000 | |
| 16(Stop S) | ∞ | variable | 1.00000 | |
| 17 | −43.88 | 2.27 | 1.75520 | 27.57 |
| 18 | −13.90 | 0.80 | 1.70154 | 41.02 |
| 19 | 38.98 | variable | 1.00000 | |
| 20 | 81.93 | 1.30 | 1.52444 | 56.21 |
| *21 | 91.62 | 1.60 | 1.00000 | |
| 22 | −179.92 | 2.30 | 1.51680 | 63.88 |
| 23 | −21.95 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.43618E−05 | 3.23919E−08 | −6.25295E−11 | 2.95784E−13 |
| 21 | 0.0000 | 2.43150E−05 | −6.35221E−09 | 2.24760E−10 | −3.95108E−12 |

[Various Data]
Variable Magnification Ratio 2.89

| | W | M | T |
|---|---|---|---|
| f | 18.50 | 35.00 | 53.40 |
| FNO | 3.64 | 4.62 | 5.88 |
| 2ω | 80.60 | 45.84 | 30.70 |
| TL | 134.86 | 128.74 | 136.72 |
| Y | 14.25 | 14.25 | 14.25 |
| d6 | 33.51 | 11.32 | 3.41 |
| d8 | 6.23 | 7.18 | 7.40 |
| d10 | 2.96 | 2.00 | 1.78 |
| d16 | 1.70 | 5.67 | 9.57 |
| d19 | 9.07 | 5.10 | 1.20 |
| Bf | 43.85 | 59.92 | 75.82 |
| GRf | 33.22 | 30.68 | 27.82 |

[Lens Group Data]

| Group | Starting surface | f |
|---|---|---|
| 1 | 1 | −24.58 |
| 2 | 7 | 76.67 |
| 3 | 9 | −60.89 |
| 4 | 11 | 22.86 |
| 5 | 17 | −31.47 |
| 6 | 20 | 46.90 |

[Values for Conditional Expressions]

(1) (−fn)/fp = 0.7813
(2) fG1/f1 = 1.5
(3) f2/(−f3) = 1.2591

Figure 2A:
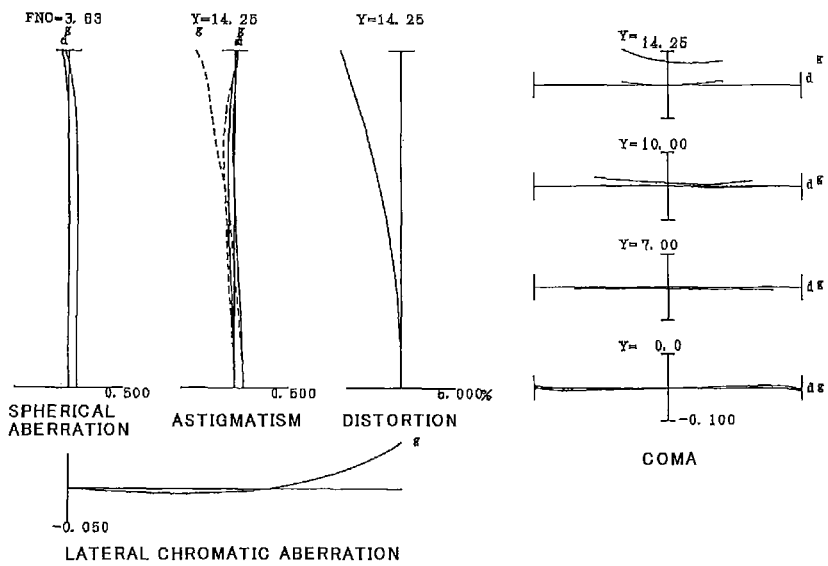
Figure 2B:
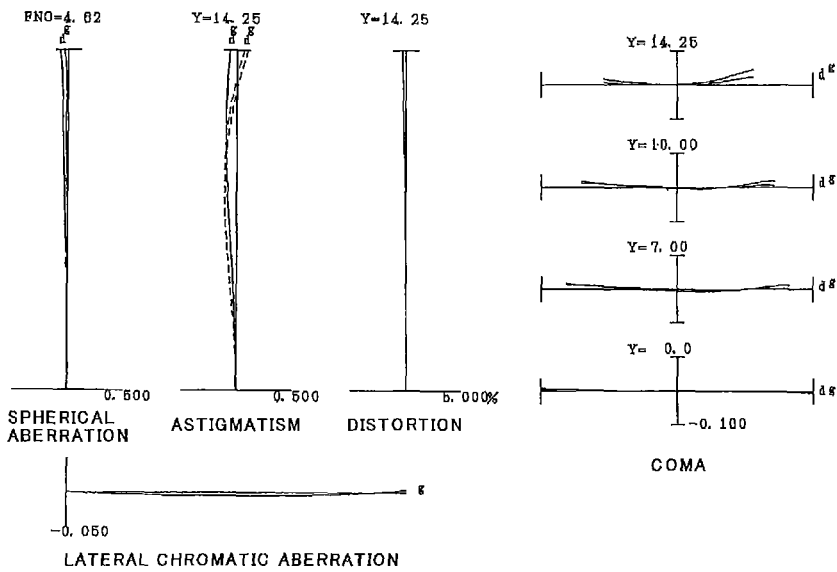
Figure 2C:
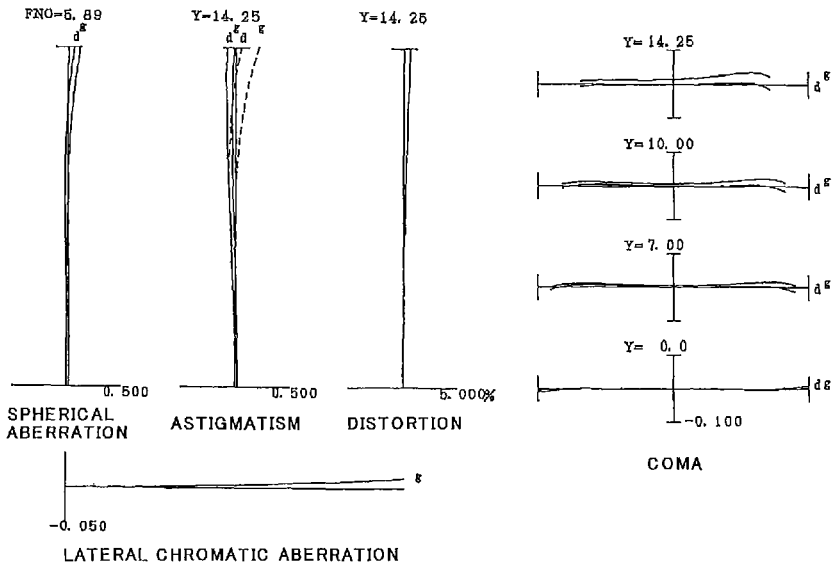

FIG. 2A, FIG. 2B and FIG. 2C are graphs showing various aberrations of the First Example according to the present embodiment upon focusing on an infinite distance object, in which FIG. 2A shows various aberrations in the wide angle end state, FIG. 2B shows various aberrations in an intermediate focal length state, and FIG. 2C shows various aberrations in a telephoto end state.

In respective graphs, FNO denotes an F-number, Y denotes an image height. In more detail, in the graph of spherical aberration, a value of F-number FNO corresponding to the maximum aperture is shown, and in the graph of astigmatism and the graph of distortion, the maximum values of the image height Y are respectively shown. In the graph of coma aberration, values of respective image heights are shown. In respective graphs, d denotes an aberration curve at d-line (wavelength λ=587.6 nm), and g denotes an aberration curve at g-line (wavelength λ=435.8 nm). In the graph showing astigmatism, a solid line indicates a sagittal image plane, and a broken line indicates a meridional image plane. In the graph of coma aberration, aberration curves at respective image heights Y are shown.

Incidentally, the above-described explanation regarding various aberration graphs is the same with respect to the other Examples.

As is apparent from the respective graphs, the variable magnification optical system according to the present Example shows superb optical performance as a result of good corrections to various aberrations from the wide-angle end state to the telephoto end state.

Second Example

FIG. 3 is a sectional view showing a variable magnification optical system according to a Second Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power.

The rear group is composed of, in order from the object side, a fourth lens group G4 having positive refractive power, a fifth lens group G5 having negative refractive power, a sixth lens group G6 having positive refractive power, and a seventh lens group G7 having positive refractive power, and has positive refractive power in an entire zooming range. Meanwhile, an aperture stop S is disposed between the fourth lens group G4 and the fifth lens group G5.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a double convex positive lens L21.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a positive meniscus lens L51 having a concave surface facing the object side.

The sixth lens group G6 consists of a negative lens L61 having a double concave shape.

The seventh lens group G7 consists of, in order from the object side, a positive lens L71 and a double convex positive lens L72. Meanwhile, the positive lens L71 is a plastic lens, of which an image side lens surface is an aspherical surface.

In the variable magnification optical system according to the present Example, upon varying magnification from the wide angle end state to the telephoto end state, the first to the seventh lens groups G1 to G7 are moved along the optical axis such that an air interval between the first lens group G1 and the second lens group G2, an air interval between the second lens group G2 and the third lens group G3, an air interval between the third lens group G3 and the fourth lens group G4, an air interval between the fourth lens group G4 and the fifth lens group G5, an air interval between the fifth lens group G5 and the sixth lens group G6 and an air interval between the sixth lens group G6 and the seventh lens group G7 are varied. Meanwhile, upon varying magnification, the aperture stop S is moved together with the fourth lens group G4 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 2 below shows various values of the variable magnification optical system according to the present Example.

TABLE 2

| Second Example | | | | |
|---|---|---|---|---|
| [Surface Data] | | | | |
| m | r | d | nd | νd |
| OP | ∞ | | | |
| 1 | 200.00 | 2.00 | 1.58913 | 61.22 |
| 2 | 19.96 | 0.17 | 1.56093 | 36.64 |
| *3 | 16.93 | 9.32 | 1.00000 | |
| 4 | 98.10 | 1.40 | 1.62299 | 58.12 |
| 5 | 21.99 | 4.89 | 1.84666 | 23.80 |
| 6 | 43.70 | variable | 1.00000 | |

TABLE 2-continued

| Second Example | | | | |
|---|---|---|---|---|
| 7 | 1523.20 | 1.62 | 1.48749 | 70.31 |
| 8 | −39.11 | variable | 1.00000 | |
| 9 | −27.04 | 0.80 | 1.77250 | 49.62 |
| 10 | −93.01 | variable | 1.00000 | |
| 11 | 45.46 | 2.73 | 1.60311 | 60.69 |
| 12 | −51.42 | 0.10 | 1.00000 | |
| 13 | 26.47 | 4.21 | 1.48749 | 70.31 |
| 14 | −25.23 | 0.80 | 1.80518 | 25.45 |
| 15 | −74.49 | 0.80 | 1.00000 | |
| 16(Stop S) | ∞ | variable | 1.00000 | |
| 17 | −68.89 | 1.63 | 1.80518 | 25.45 |
| 18 | −28.29 | variable | 1.00000 | |
| 19 | −30.06 | 0.80 | 1.74400 | 44.81 |
| 20 | 42.20 | variable | 1.00000 | |
| 21 | 100.00 | 1.30 | 1.52444 | 56.21 |
| *22 | 100.00 | 1.42 | 1.00000 | |
| 23 | 1520.63 | 2.32 | 1.48749 | 70.31 |
| 24 | −24.28 | Bf | 1.00000 | |
| Image plane | ∞ | | | |

| [Aspherical Data] | | | | | |
|---|---|---|---|---|---|
| m | κ | A4 | A6 | A8 | A10 |
| 3 | 0.0000 | 9.23892E−06 | 9.19334E−09 | 6.82199E−12 | 1.52803E−15 |
| 22 | 0.0000 | 2.63777E−05 | 6.32291E−08 | −1.38338E−09 | 1.18222E−11 |

| [Various Data] Variable Magnification Ratio 2.89 | | | |
|---|---|---|---|
| | W | M | T |
| f | 18.50 | 35.00 | 53.40 |
| FNO | 3.63 | 4.60 | 5.88 |
| 2ω | 80.59 | 45.94 | 30.87 |
| TL | 134.92 | 129.26 | 136.72 |
| Y | 14.25 | 14.25 | 14.25 |
| d6 | 36.76 | 10.71 | 3.40 |
| d8 | 5.58 | 9.28 | 6.84 |
| d10 | 3.44 | 2.67 | 1.78 |
| d16 | 1.70 | 4.21 | 6.63 |
| d18 | 1.00 | 1.22 | 1.40 |
| d20 | 7.32 | 3.98 | 1.21 |
| Bf | 42.82 | 60.88 | 79.17 |
| GRf | 30.80 | 29.03 | 27.46 |

| [Lens Group Data] | | |
|---|---|---|
| Group | Starting surface | f |
| 1 | 1 | −27.90 |
| 2 | 7 | 78.25 |
| 3 | 9 | −49.63 |
| 4 | 11 | 24.38 |
| 5 | 17 | 58.58 |
| 6 | 19 | −23.49 |
| 7 | 21 | 49.21 |

| [Values for Conditional Expressions] | |
|---|---|
| (1) | (−fn)/fp = 0.6707 |
| (2) | fG1/f1 = 1.1 |
| (3) | f2/(−f3) = 1.5768 |

Figure 4A:
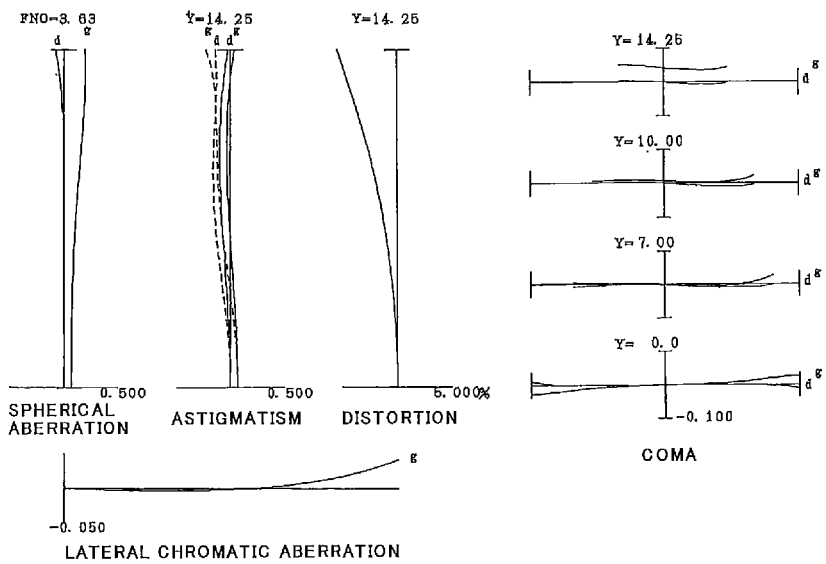
Figure 4B:
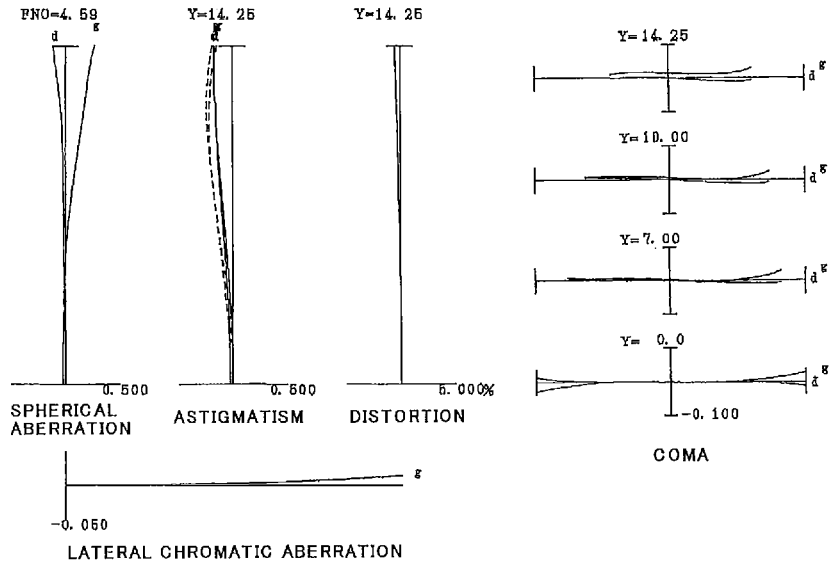
Figure 4C:
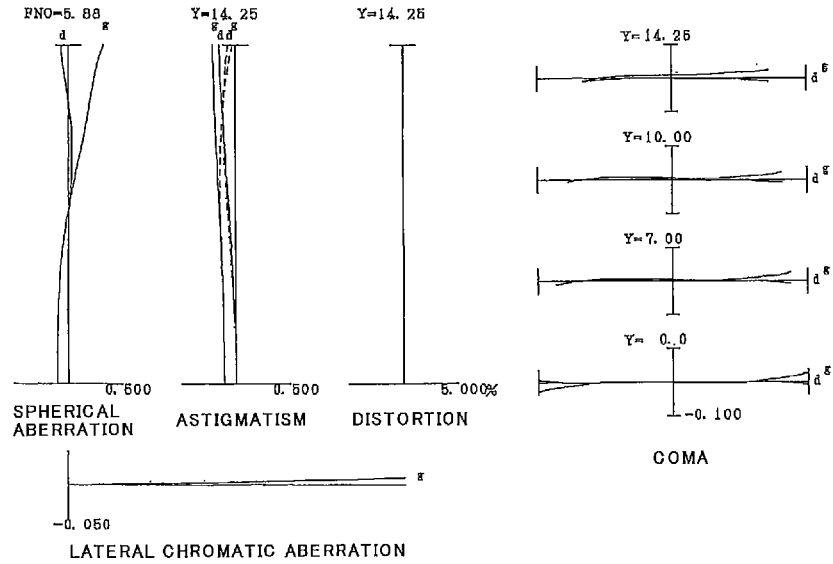

FIG. 4A, FIG. 4B and FIG. 4C are graphs showing various aberrations of the Second Example according to the present embodiment upon focusing on an infinite distance object, in which FIG. 4A shows various aberrations in a wide angle end state, FIG. 4B shows various aberrations in an intermediate focal length state, and FIG. 4C shows various aberrations in a telephoto end state.

As is apparent from the respective graphs, the variable magnification optical system according to the present Example shows superb optical performance as a result of good corrections to various aberrations from the wide-angle end state to the telephoto end state.

Third Example

Figure 5:
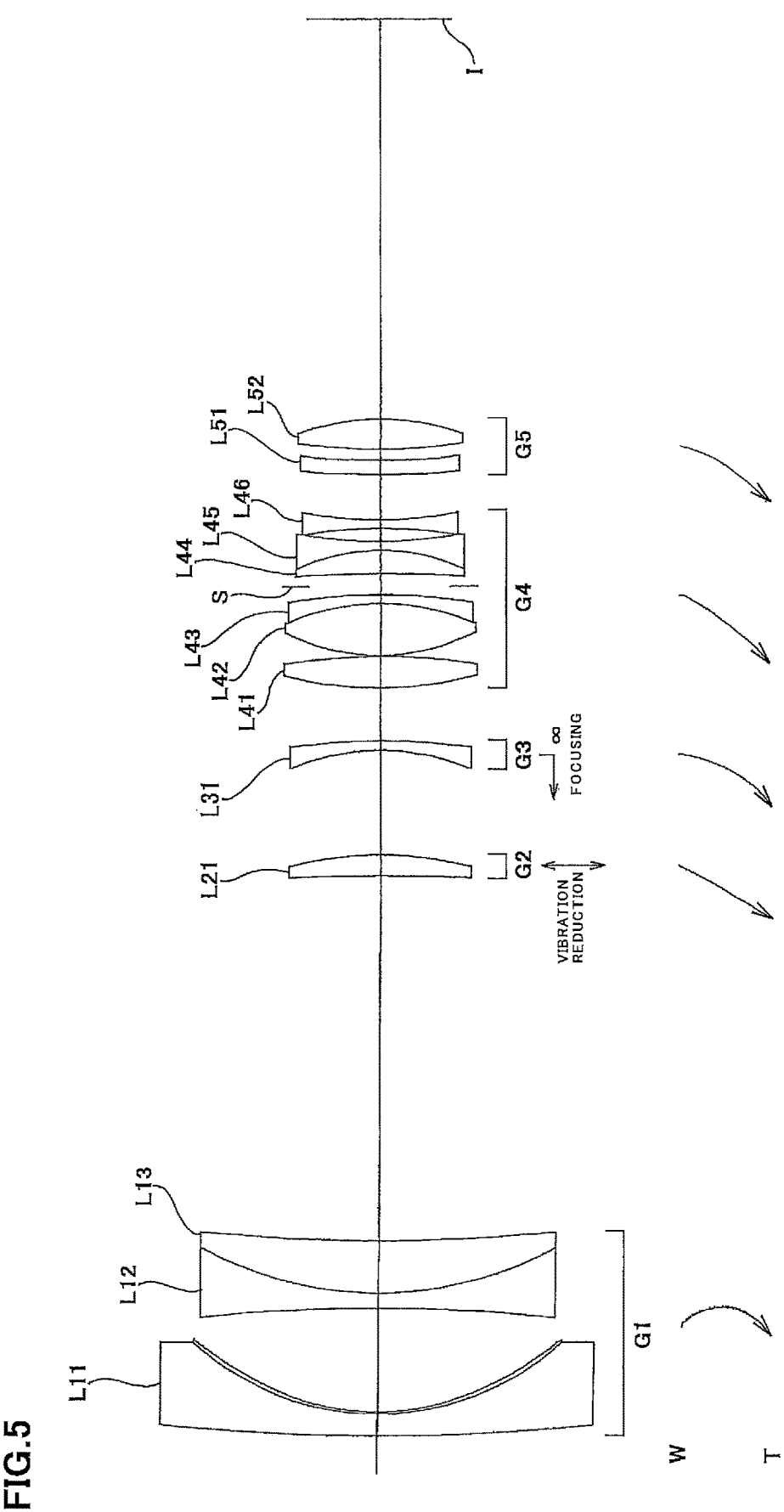
FIG. 5 is a sectional view showing a lens configuration of a variable magnification optical system in a wide angle end state according to a Third Example.

FIG. 5 is a sectional view showing a variable magnification optical system according to a Third Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power.

The rear group is composed of, in order from the object side, a fourth lens group G4 having positive refractive power and a fifth lens group G5 having negative refractive power, and has positive refractive power in an entire zooming range.

The first lens group G1 consists of, in order from the object side, a negative meniscus lens L11 having a convex surface facing the object side, and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, an aperture stop S, a cemented lens constructed by a positive meniscus lens L44 having a concave surface facing the object side cemented with a double concave negative lens L45, and a double concave negative lens L46.

The fifth lens group G5 consists of, in order from the object side, a positive meniscus lens L51 having a convex surface facing the object side, and a double convex positive lens L52. Meanwhile, the positive meniscus lens L51 is a plastic lens, of which an image side lens surface is formed with an aspherical surface.

In the variable magnification optical system according to the present Example, upon varying magnification from the wide angle end state to the telephoto end state, the first to the fifth lens groups G1 to G5 are moved along the optical axis such that an air interval between the first lens group G1 and the second lens group G2, an air interval between the second lens group G2 and the third lens group G3, an air interval between the third lens group G3 and the fourth lens group G4, and an air interval between the fourth lens group G4 and the fifth lens group G5 are varied.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 3 below shows various values of the variable magnification optical system according to the present Example.

TABLE 3

Third Example

[Surface Data]

| m | r | d | nd | νd |
|---|---|---|---|---|
| OP | ∞ | | | |
| 1 | 200.00 | 2.00 | 1.77250 | 49.62 |
| 2 | 25.76 | 0.17 | 1.56093 | 36.64 |
| *3 | 22.20 | 9.67 | 1.00000 | |
| 4 | −170.65 | 1.40 | 1.60300 | 65.44 |
| 5 | 34.92 | 4.88 | 1.84666 | 23.80 |
| 6 | 164.87 | variable | 1.00000 | |
| 7 | −228.70 | 1.97 | 1.48749 | 70.31 |
| 8 | −33.44 | variable | 1.00000 | |
| 9 | −22.06 | 0.80 | 1.77250 | 49.62 |
| 10 | −70.40 | variable | 1.00000 | |
| 11 | 37.95 | 2.90 | 1.60311 | 60.69 |
| 12 | −59.79 | 0.10 | 1.00000 | |
| 13 | 20.00 | 4.82 | 1.48749 | 70.31 |
| 14 | −22.46 | 0.80 | 1.79504 | 28.69 |
| 15 | −53.68 | 0.75 | 1.00000 | |
| 16(Stop S) | ∞ | 1.18 | 1.00000 | |
| 17 | −140.06 | 2.16 | 1.84666 | 23.80 |
| 18 | −18.88 | 0.80 | 1.60342 | 38.03 |
| 19 | 43.49 | 1.20 | 1.00000 | |
| 20 | −46.54 | 0.80 | 1.85026 | 32.35 |
| 21 | 41.66 | variable | 1.00000 | |
| 22 | 80.00 | 1.30 | 1.52444 | 56.21 |
| *23 | 100.00 | 1.05 | 1.00000 | |
| 24 | 55.99 | 2.76 | 1.48749 | 70.31 |
| 25 | −23.72 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.57126E−06 | −4.01560E−09 | 2.48503E−12 | 7.35013E−15 |
| 23 | 0.0000 | 5.16993E−05 | 1.06268E−07 | −1.41581E−09 | 1.12654E−11 |

TABLE 3-continued

Third Example

[Various Data]
Variable Magnification Ratio 2.89

|      | W      | M      | T      |
|------|--------|--------|--------|
| f    | 18.50  | 35.00  | 53.40  |
| FNO  | 3.58   | 4.60   | 5.88   |
| 2ω   | 80.58  | 46.69  | 31.19  |
| TL   | 135.31 | 126.75 | 137.82 |
| Y    | 14.25  | 14.25  | 14.25  |
| d6   | 33.66  | 10.67  | 3.13   |
| d8   | 9.68   | 7.88   | 6.52   |
| d10  | 4.94   | 2.69   | 1.50   |
| d21  | 4.10   | 2.18   | 1.20   |
| Bf   | 41.42  | 61.82  | 83.95  |
| GRf  | 28.27  | 27.20  | 26.69  |

[Lens Group Data]

| Group | Starting surface | f       |
|-------|------------------|---------|
| 1     | 1                | −31.31  |
| 2     | 7                | 80.09   |
| 3     | 9                | −41.90  |
| 4     | 11               | 41.45   |
| 5     | 22               | 33.32   |

[Values for Conditional Expressions]

| (1) | (−fn)/fp = 0.6592 |
| (2) | fG1/f1 = 1.1 |
| (3) | f2/(−f3) = 1.9114 |

Figure 6A:
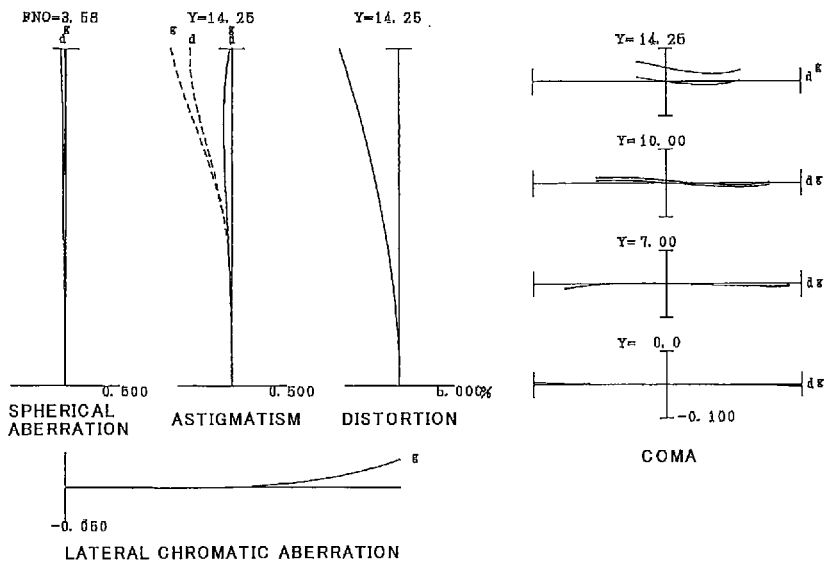
Figure 6B:
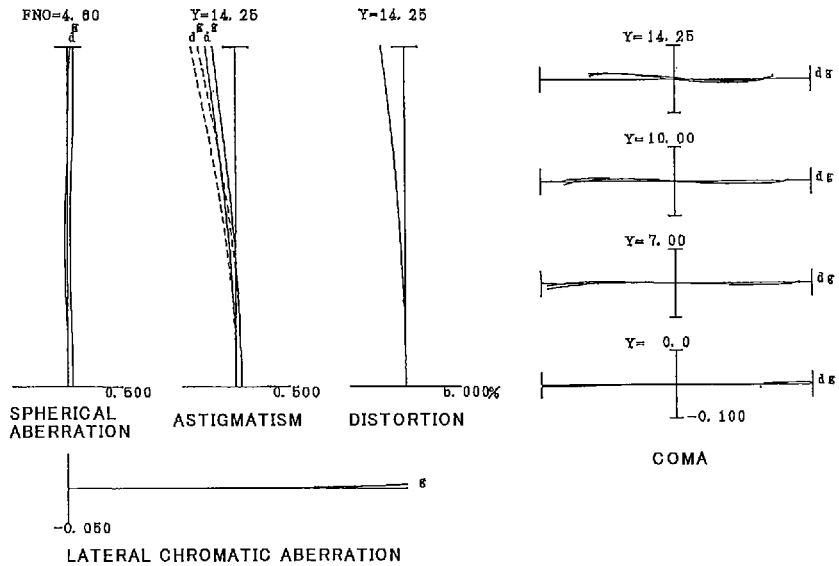
Figure 6C:
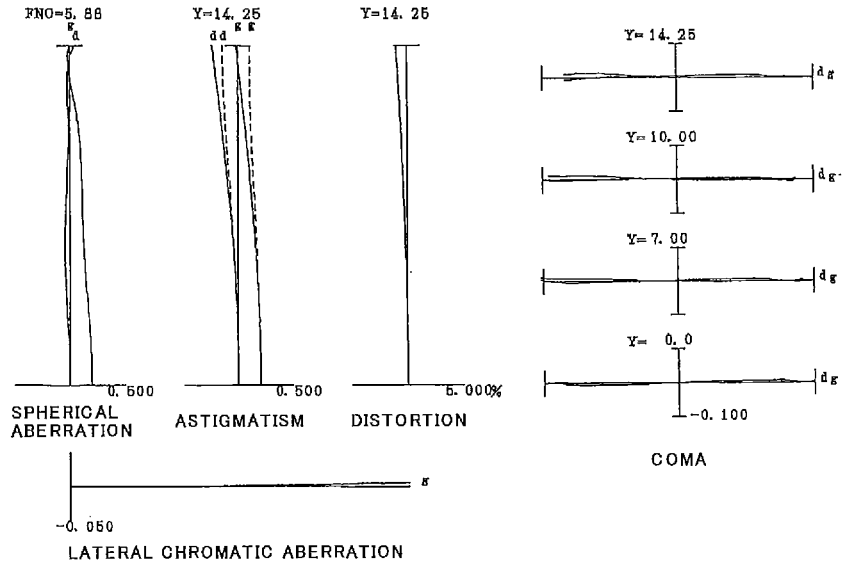

FIG. 6A, FIG. 6B and FIG. 6C are graphs showing various aberrations of the Third Example according to the present embodiment upon focusing on an infinite distance object, in which FIG. 6A shows various aberrations in a wide angle end state, FIG. 6B shows various aberrations in an intermediate focal length state, and FIG. 6C shows various aberrations in a telephoto end state.

As is apparent from the respective graphs, the variable magnification optical system according to the present Example shows superb optical performance as a result of good corrections to various aberrations from the wide-angle end state to the telephoto end state.

Fourth Example

FIG. 7 is a sectional view showing a variable magnification optical system according to a Fourth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power.

The rear group is composed of, in order from the object side, a fourth lens group G4 having positive refractive power, and a fifth lens group G5 having negative refractive power, and has positive refractive power in an entire zooming range. Meanwhile, an aperture stop S is disposed between the fourth lens group G4 and the fifth lens group G5.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of, in order from the object side, a cemented lens constructed by a positive meniscus lens L51 having a concave surface facing the object side cemented with a negative meniscus lens L52 having a concave surface facing the object side, a negative meniscus lens L53 having a convex surface facing the object side, a negative meniscus lens L54 having a convex surface facing the object side, and a positive meniscus lens L55 having a concave surface facing the object side. Meanwhile, the negative meniscus lens L54 is a plastic lens, of which an image side lens surface is formed with an aspherical surface.

In the variable magnification optical system according to the present Example, upon varying magnification from the wide angle end state to the telephoto end state, the first to the fifth lens groups G1 to G5 are moved along the optical axis such that an air interval between the first lens group G1 and the second lens group G2, an air interval between the second lens group G2 and the third lens group G3, an air interval between the third lens group G3 and the fourth lens group G4, and an air interval between the fourth lens group G4 and the fifth lens group G5 are varied. Meanwhile, upon varying magnification, the aperture stop S is moved with the fourth lens group G4 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 4 below shows various values of the variable magnification optical system according to the present Example.

TABLE 4

Fourth Example

[Surface Data]

| m | r | d | nd | νd |
|---|---|---|---|---|
| OP | ∞ | | | |
| 1 | 91.29 | 2.00 | 1.6968 | 55.52 |
| 2 | 20.16 | 0.17 | 1.56093 | 36.64 |
| *3 | 17.52 | 9.38 | 1.00000 | |
| 4 | 256.60 | 1.40 | 1.804 | 46.6 |
| 5 | 23.16 | 5.46 | 1.84666 | 23.8 |
| 6 | 88.16 | variable | 1.00000 | |
| 7 | −559.65 | 2.04 | 1.48749 | 70.31 |
| 8 | −36.71 | variable | 1.00000 | |
| 9 | −21.56 | 0.80 | 1.7725 | 49.62 |
| 10 | −43.48 | variable | 1.00000 | |
| 11 | 58.96 | 3.47 | 1.60311 | 60.69 |
| 12 | −28.12 | 0.10 | 1.00000 | |
| 13 | 34.90 | 4.31 | 1.58913 | 61.22 |
| 14 | −23.25 | 0.80 | 1.84666 | 23.8 |
| 15 | −58.83 | 0.75 | 1.00000 | |
| 16(Stop S) | ∞ | variable | 1.00000 | |
| 17 | −29.21 | 2.10 | 1.7552 | 27.57 |
| 18 | −14.00 | 0.80 | 1.83481 | 42.73 |
| 19 | −82.86 | 2.95 | 1.00000 | |
| 20 | 67.12 | 0.80 | 1.7725 | 49.62 |
| 21 | 23.28 | 2.23 | 1.00000 | |
| 22 | 100.00 | 1.30 | 1.52444 | 56.21 |
| *23 | 80.00 | 1.92 | 1.00000 | |
| 24 | −56.13 | 2.45 | 1.48749 | 70.31 |
| 25 | −16.02 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.57126E−06 | −4.01560E−09 | 2.48503E−12 | 7.35013E−15 |
| 23 | 0.0000 | 5.16993E−05 | 1.06268E−07 | −1.41581E−09 | 1.12654E−11 |

[Various Data]
Variable Magnification Ratio 2.89

| | W | M | T |
|---|---|---|---|
| f | 18.50 | 35.00 | 53.40 |
| FNO | 3.57 | 4.69 | 5.88 |
| 2ω | 80.58 | 45.39 | 30.32 |
| TL | 135.32 | 132.96 | 136.28 |
| Y | 14.25 | 14.25 | 14.25 |
| d6 | 25.19 | 5.65 | 3.26 |
| d8 | 7.43 | 11.44 | 7.48 |
| d10 | 13.11 | 6.88 | 1.50 |
| d21 | 1.82 | 3.98 | 7.60 |
| Bf | 42.56 | 59.79 | 71.24 |
| GRf | 32.15 | 30.54 | 28.17 |

[Lens Group Data]

| Group | Starting surface | f |
|---|---|---|
| 1 | 1 | −26.63 |
| 2 | 7 | 80.49 |
| 3 | 9 | −56.24 |
| 4 | 11 | 19.91 |
| 5 | 17 | −66.02 |

TABLE 4-continued

Fourth Example

[Values for Conditional Expressions]

(1) $(-fn)/fp = 0.8887$
(2) $fG1/f1 = 1.2$
(3) $f2/(-f3) = 1.4311$

Figure 8A:
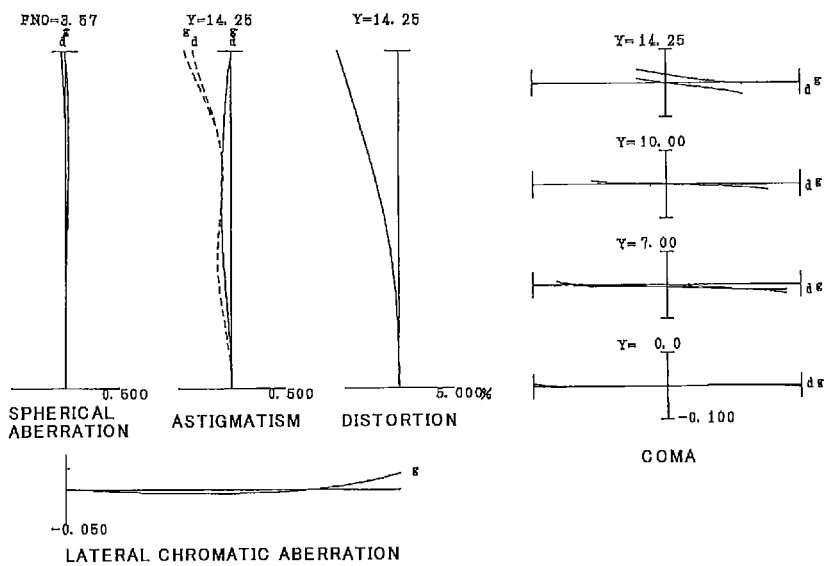
Figure 8B:
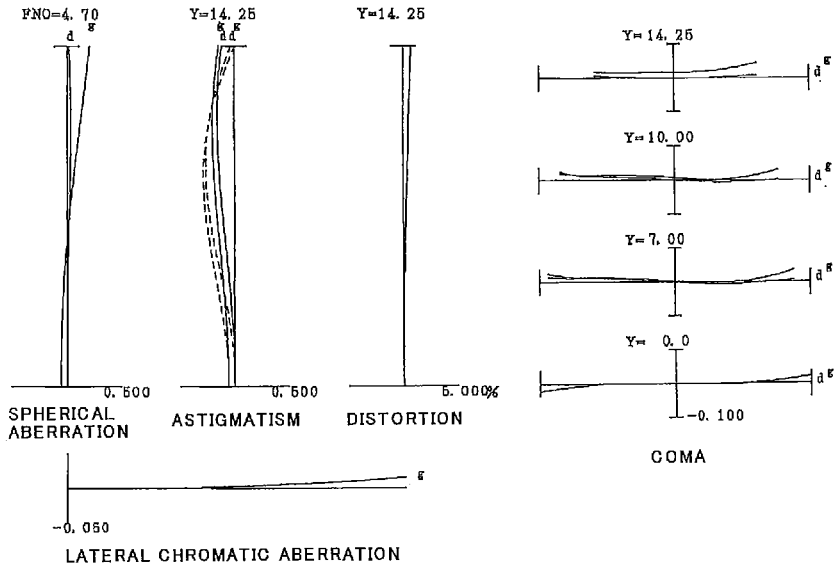
Figure 8C:
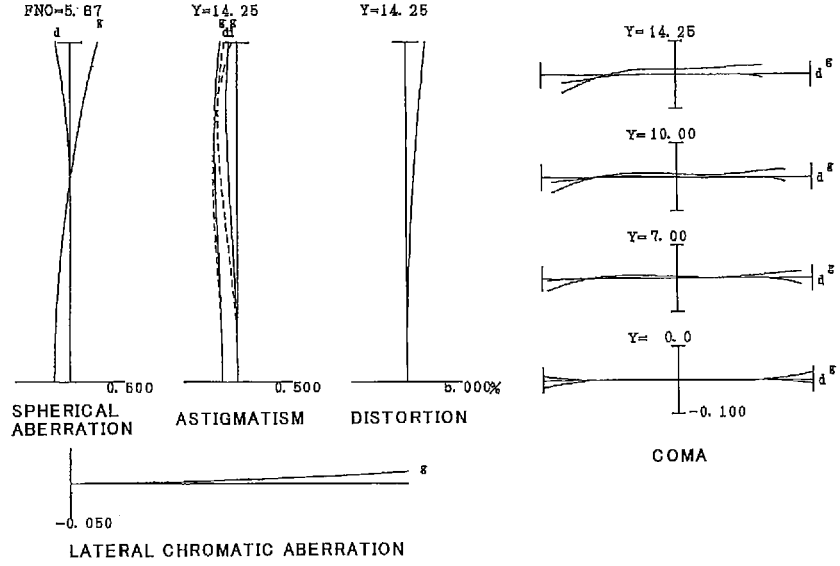

FIG. 8A, FIG. 8B and FIG. 8C are graphs showing various aberrations of the Fourth Example according to the present embodiment upon focusing on an infinite distance object, in which FIG. 8A shows various aberrations in a wide angle end state, FIG. 8B shows various aberrations in an intermediate focal length state, and FIG. 8C shows various aberrations in a telephoto end state.

As is apparent from the respective graphs, the variable magnification optical system according to the present Example shows superb optical performance as a result of good corrections to various aberrations from the wide-angle end state to the telephoto end state.

Fifth Example

Figure 9:
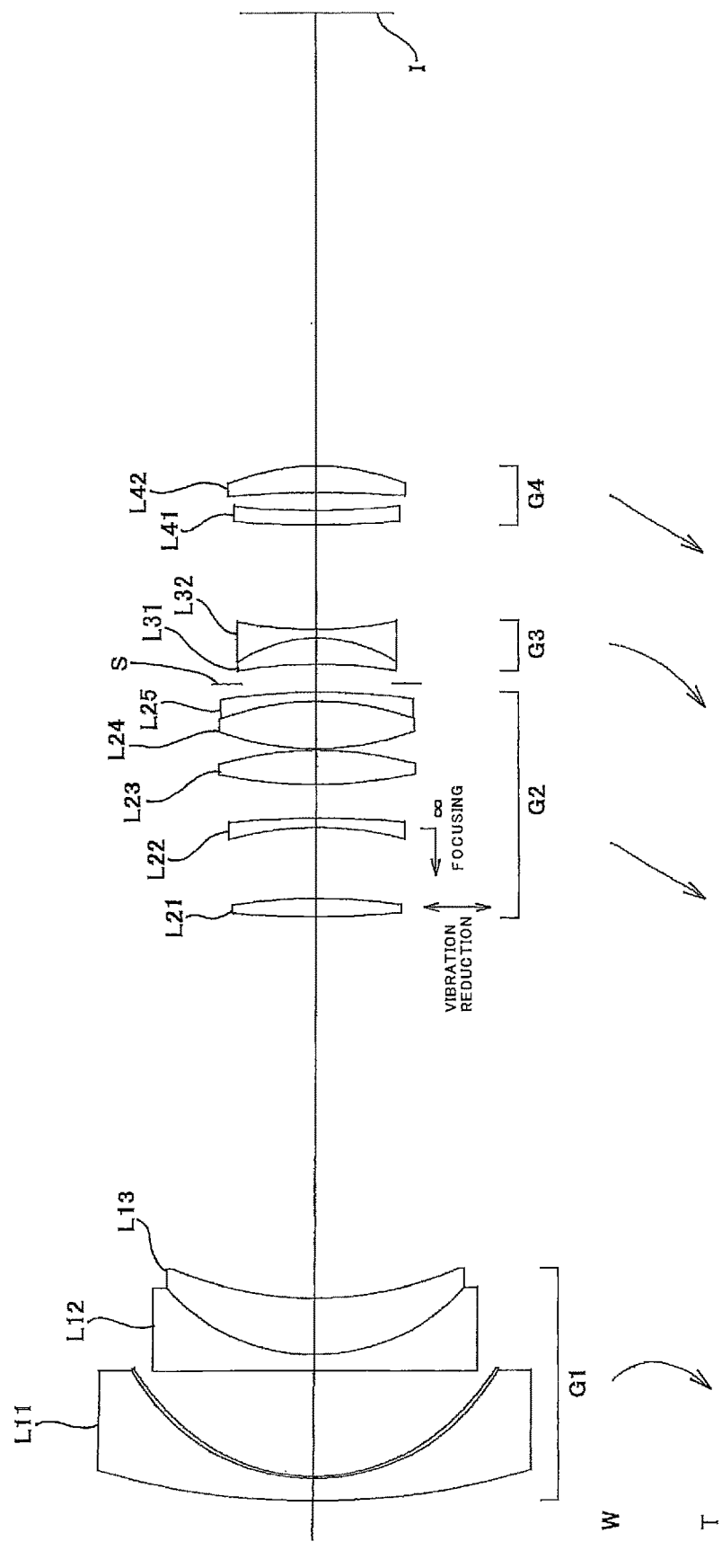
FIG. 9 is a sectional view showing a lens configuration of a variable magnification optical system in a wide angle end state according to a Fifth Example.

FIG. 9 is a sectional view showing a variable magnification optical system according to a Fifth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power. Meanwhile, an aperture stop S is disposed between the second lens group G2 and the third lens group G3.

The rear group is composed of a fourth lens group G4 having positive refractive power, and has positive refractive power in an entire zooming range.

The first lens group G1 consists of, in order from the object side, a negative meniscus lens L11 having a convex surface facing the object side, and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of, in order from the object side, a double convex positive lens L21, a negative meniscus lens L22 having a concave surface facing the object side, a double convex positive lens L23, a cemented lens constructed by a double convex positive lens L24 cemented with a negative meniscus lens L25 having a concave surface facing the object side, and an aperture stop S.

The third lens group G3 consists of a cemented lens constructed by, in order from the object side, a positive meniscus lens L31 having a concave surface facing the object side cemented with a double concave negative lens L32.

The fourth lens group G4 consists of, in order from the object side, a positive meniscus lens L41 having a convex surface facing the object side and a positive meniscus lens L42 having a concave surface facing the object side. Meanwhile, the positive meniscus lens L41 is a plastic lens, and an image side lens surface of the positive meniscus lens L42 is formed with an aspherical surface.

In the variable magnification optical system according to the present Example, upon varying magnification from the wide angle end state to the telephoto end state, the first to the fourth lens groups G1 to G4 are moved along the optical axis such that an air interval between the first lens group G1 and the second lens group G2, an air interval between the second lens group G2 and the third lens group G3, and an air interval between the third lens group G3 and the fourth lens group G4, are varied. In more detail, upon varying magnification, the second and the fourth lens groups G2 and G4 are moved together in a body. Meanwhile, upon varying magnification, the aperture stop S is moved together with the second lens group G2 in a body.

In the variable magnification optical system according to the present Example, focusing from an infinite distance object to a close distance object is carried out by moving the negative meniscus lens L22 in the second lens group G2 along the optical axis toward the object side.

In the variable magnification optical system according to the present Example, vibration reduction is carried out by moving the positive lens L21 in the second lens group G2 in a direction to have a component perpendicular to the optical axis.

Table 5 below shows various values of the variable magnification optical system according to the present Example.

TABLE 5

Fifth Example

[Surface Data]

| m | r | d | nd | νd |
|---|---|---|---|---|
| OP | ∞ | | | |
| 1 | 70.11 | 2.00 | 1.58913 | 61.22 |
| 2 | 18.88 | 0.17 | 1.56093 | 36.64 |
| *3 | 17.05 | 9.35 | 1.00000 | |
| 4 | −2481.05 | 1.40 | 1.62299 | 58.12 |
| 5 | 18.03 | 5.00 | 1.84666 | 23.80 |
| 6 | 32.74 | variable | 1.00000 | |
| 7 | 90.12 | 1.65 | 1.48749 | 70.31 |

TABLE 5-continued

Fifth Example

| | | | | |
|---|---|---|---|---|
| 8 | −48.23 | 6.23 | 1.00000 | |
| 9 | −30.43 | 0.80 | 1.77250 | 49.62 |
| 10 | −87.64 | 2.96 | 1.00000 | |
| 11 | 43.72 | 3.05 | 1.48749 | 70.31 |
| 12 | −32.08 | 0.10 | 1.00000 | |
| 13 | 25.50 | 4.20 | 1.48749 | 70.31 |
| 14 | −25.50 | 0.80 | 1.84666 | 23.80 |
| 15 | −60.79 | 0.75 | 1.00000 | |
| 16(Stop S) | ∞ | variable | 1.00000 | |
| 17 | −44.35 | 2.27 | 1.75520 | 27.57 |
| 18 | −13.14 | 0.80 | 1.70154 | 41.02 |
| 19 | 38.98 | variable | 1.00000 | |
| 20 | 81.93 | 1.30 | 1.52444 | 56.21 |
| 21 | 91.62 | 1.60 | 1.00000 | |
| 22 | −93.48 | 2.30 | 1.51680 | 63.88 |
| *23 | −21.95 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.67499E−05 | 2.00068E−08 | −5.26097E−12 | 2.70529E−13 |
| 23 | 0.0000 | 2.72442E−05 | 8.63364E−08 | −1.90704E−09 | 1.39737E−11 |

[Various Data]
Variable Magnification Ratio 2.89

| | W | M | T |
|---|---|---|---|
| f | 18.50 | 35.00 | 53.40 |
| FNO | 3.65 | 4.65 | 5.96 |
| 2ω | 80.64 | 45.85 | 30.71 |
| TL | 132.42 | 126.38 | 134.26 |
| Y | 14.25 | 14.25 | 14.25 |
| d6 | 33.51 | 11.32 | 3.41 |
| d 16 | 1.70 | 5.67 | 9.57 |
| d 19 | 9.07 | 5.10 | 1.20 |
| Bf | 41.41 | 57.56 | 73.36 |
| GRf | 53.25 | 53.25 | 53.25 |

[Lens Group Data]

| Group | Starting surface | f |
|---|---|---|
| 1 | 1 | −23.01 |
| 2 | 7 | 24.76 |
| 3 | 17 | −31.50 |
| 4 | 20 | 53.25 |

[Values for Conditional Expressions]

| (1) | (−fn)/fp = 0.700 |
|---|---|
| (2) | fG1/f1 = 1.7 |
| (3) | f2/(−f3) = 0.7860 |

Figure 10A:
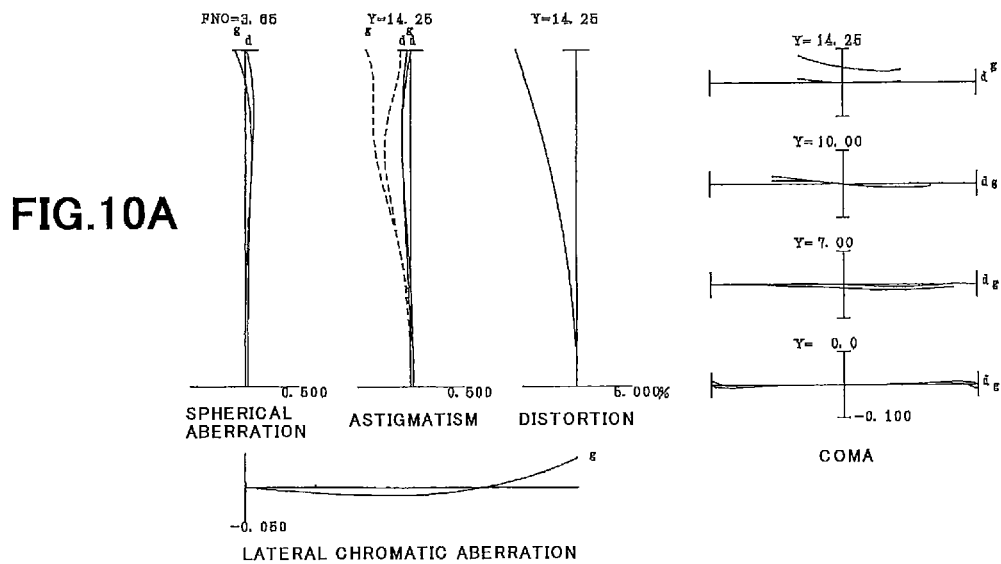
Figure 10B:
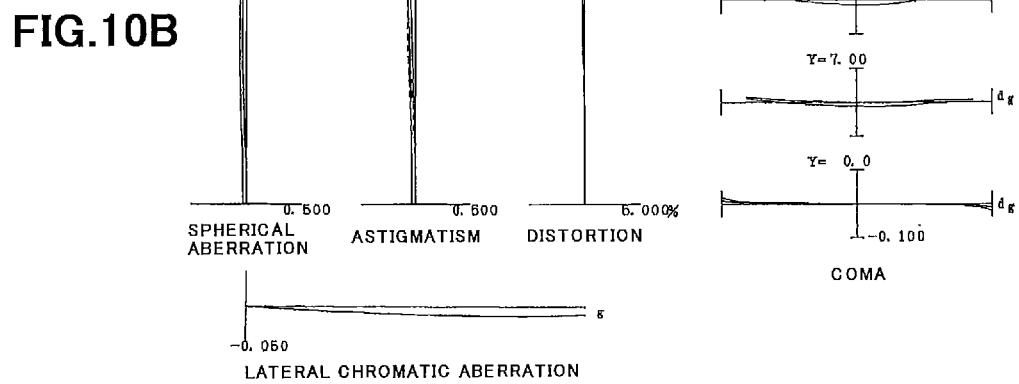
Figure 10C:
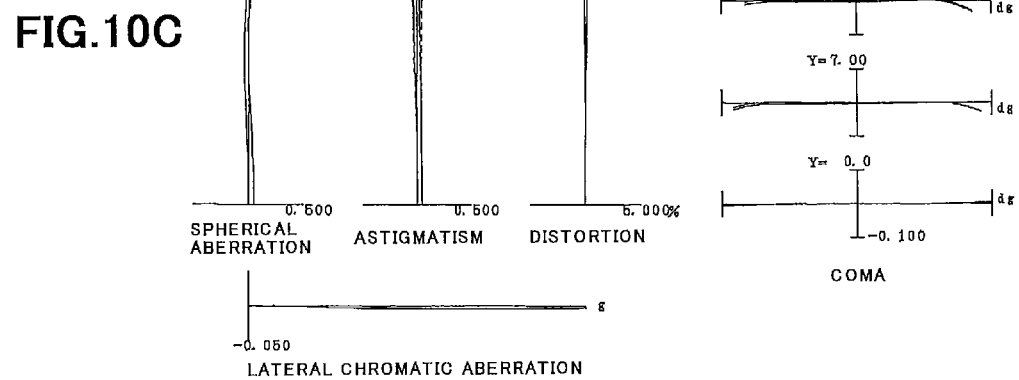

FIG. 10A, FIG. 10B and FIG. 10C are graphs showing various aberrations of the Fifth Example according to the present embodiment upon focusing on an infinite distance object, in which FIG. 10A shows various aberrations in a wide angle end state, FIG. 10B shows various aberrations in an intermediate focal length state, and FIG. 10C shows various aberrations in a telephoto end state.

As is apparent from the respective graphs, the variable magnification optical system according to the present Example shows superb optical performance as a result of good corrections to various aberrations from the wide-angle end state to the telephoto end state.

Sixth Example

Figure 11:
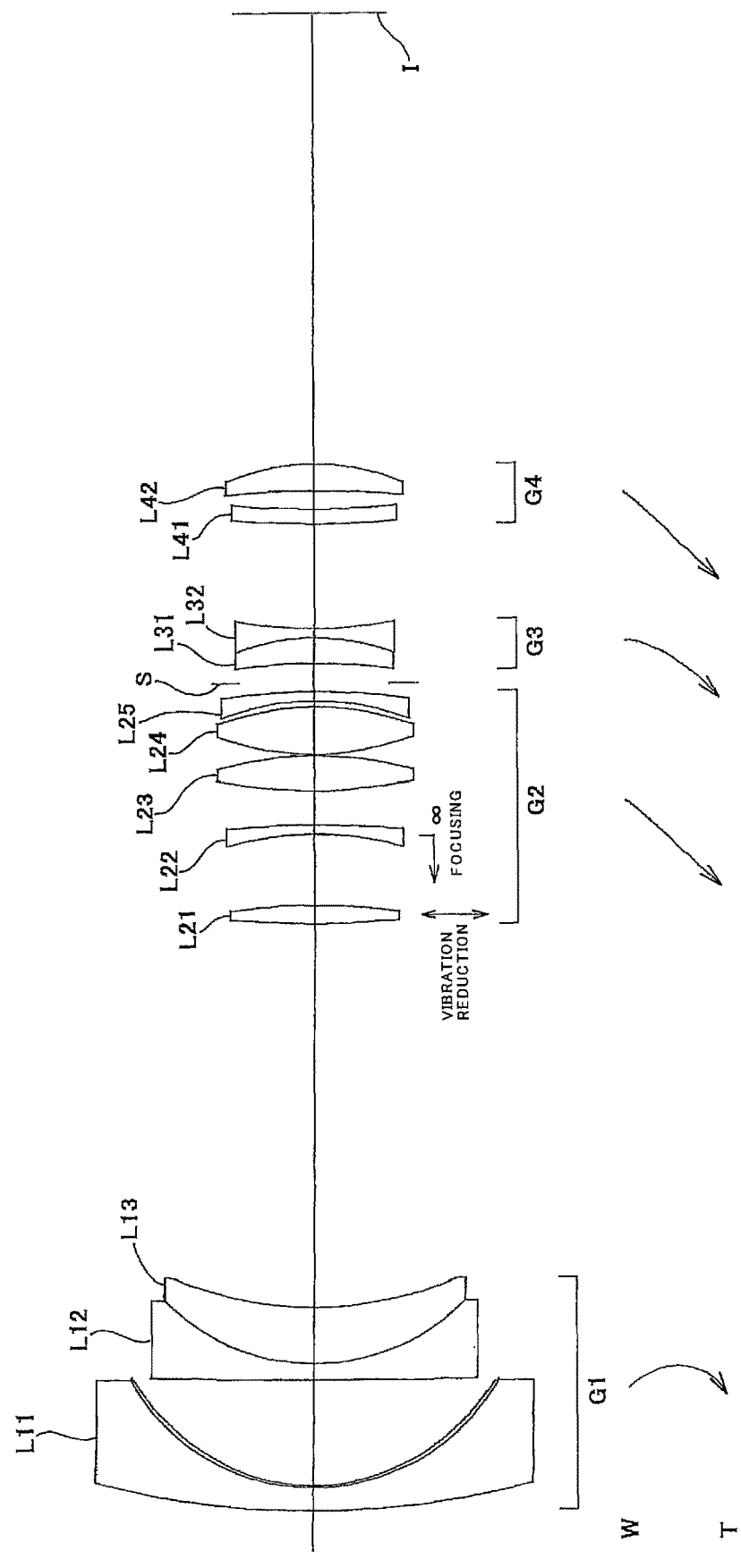
FIG. 11 is a sectional view showing a lens configuration of a variable magnification optical system in a wide angle end state according to a Sixth Example.

FIG. 11 is a sectional view showing a variable magnification optical system according to a Sixth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power. Meanwhile, an aperture stop S is disposed between the second lens group G2 and the third lens group G3.

The rear group is composed of a fourth lens group G4 having positive refractive power, and has positive refractive power in an entire zooming range.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of, in order from the object side, a double convex positive lens L21, a negative meniscus lens L22 having a concave surface facing the object side, a double convex positive lens L23, a double convex positive lens L24, a negative meniscus lens L25 having a concave surface facing the object side, and an aperture stop S.

The third lens group G3 consists of a cemented lens constructed by, in order from the object side, a positive meniscus lens L31 having a concave surface facing the object side cemented with a double concave negative lens L32.

The fourth lens group G4 consists of, in order from the object side, a positive meniscus lens L41 having a convex surface facing the object side and a positive meniscus lens L42 having a concave surface facing the object side. Meanwhile, the positive meniscus lens L41 is a plastic lens, and an image side lens surface of the positive meniscus lens L42 is formed with an aspherical surface.

In the variable magnification optical system according to the present Example, upon varying magnification from the wide angle end state to the telephoto end state, the first to the fourth lens groups G1 to G4 are moved along the optical axis such that an air interval between the first lens group G1 and the second lens group G2, an air interval between the second lens group G2 and the third lens group G3, and an air interval between the third lens group G3 and the fourth lens group G4, are varied. In more detail, upon varying magnification, the second and the fourth lens groups G2 and G4 are moved together in a body. Meanwhile, upon varying magnification, the aperture stop S is moved together with the second lens group G2 in a body.

In the variable magnification optical system according to the present Example, focusing from an infinite distance object to a close distance object is carried out by moving the negative meniscus lens L22 in the second lens group G2 along the optical axis toward the object side.

In the variable magnification optical system according to the present Example, vibration reduction is carried out by moving the positive lens L21 in the second lens group G2 in a direction to have a component perpendicular to the optical axis.

Table 6 below shows various values of the variable magnification optical system according to the present Example.

TABLE 6

Sixth Example

[Surface Data]

| m | r | d | nd | νd |
|---|---|---|---|---|
| OP | ∞ | | | |
| 1 | 77.10 | 2.00 | 1.58913 | 61.22 |
| 2 | 18.88 | 0.17 | 1.56093 | 36.64 |
| *3 | 17.05 | 9.35 | 1.00000 | |
| 4 | 534.62 | 1.40 | 1.62299 | 58.12 |
| 5 | 18.71 | 5.00 | 1.84666 | 23.80 |
| 6 | 32.74 | variable | 1.00000 | |
| 7 | 88.62 | 1.65 | 1.48749 | 70.31 |
| 8 | −48.23 | 0.00 | 1.00000 | |
| 9 | −28.98 | 0.80 | 1.77250 | 49.62 |
| 10 | −87.64 | 2.96 | 1.00000 | |
| 11 | 44.36 | 3.05 | 1.48749 | 70.31 |
| 12 | −33.31 | 0.10 | 1.00000 | |
| 13 | 24.99 | 4.20 | 1.49782 | 82.57 |
| 14 | −25.35 | 0.50 | 1.00000 | |
| 15 | −24.49 | 0.80 | 1.85026 | 32.35 |
| 16 | −60.43 | 0.75 | 1.00000 | |
| 17(Stop S) | ∞ | variable | 1.00000 | |
| 18 | −55.04 | 2.27 | 1.75520 | 27.57 |
| 19 | −20.28 | 0.80 | 1.70154 | 41.02 |
| 20 | 38.98 | variable | 1.00000 | |
| 21 | 81.93 | 1.30 | 1.52444 | 56.21 |
| 22 | 91.62 | 1.60 | 1.00000 | |
| 23 | −84.15 | 2.30 | 1.51680 | 63.88 |
| *24 | −21.95 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.55471E−05 | 2.80770E−08 | −3.49740E−11 | 2.62530E−13 |
| 24 | 0.0000 | 2.36026E−05 | 2.68745E−07 | −5.43216E−09 | 3.82798E−11 |

[Various Data]
Variable Magnification Ratio 2.89

| | W | M | T |
|---|---|---|---|
| f | 18.50 | 35.00 | 53.40 |
| FNO | 3.65 | 4.60 | 6.01 |
| 2ω | 80.77 | 45.80 | 30.69 |

TABLE 6-continued

| Sixth Example | | | |
|---|---|---|---|
| TL | 131.27 | 125.73 | 134.21 |
| Y | 14.25 | 14.25 | 14.25 |
| d6 | 33.51 | 11.32 | 3.41 |
| d17 | 1.70 | 5.67 | 9.57 |
| d20 | 9.07 | 5.10 | 1.20 |
| Bf | 39.77 | 56.41 | 72.81 |
| GRf | 54.97 | 54.97 | 54.97 |

[Lens Group Data]

| Group | Starting surface | f |
|---|---|---|
| 1 | 1 | −23.18 |
| 2 | 7 | 25.27 |
| 3 | 18 | −33.97 |
| 4 | 21 | 54.97 |

[Values for Conditional Expressions]

(1) $(-fn)/fp = 0.7030$
(2) $fG1/f1 = 1.6$
(3) $f2/(-f3) = 0.7440$

Figure 12A:
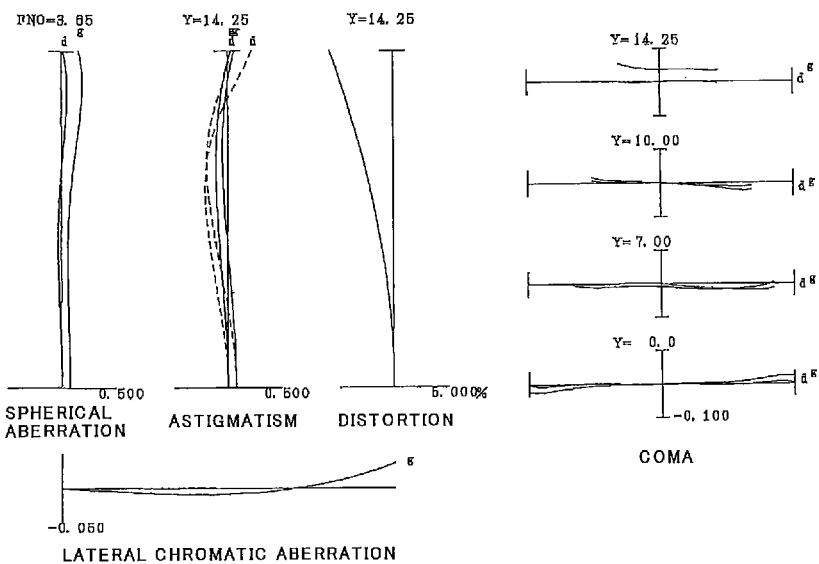
Figure 12B:
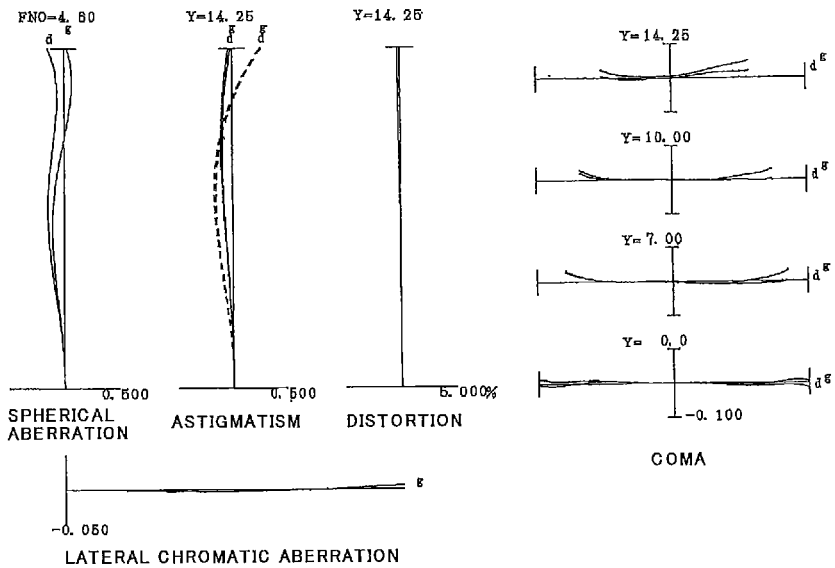
Figure 12C:
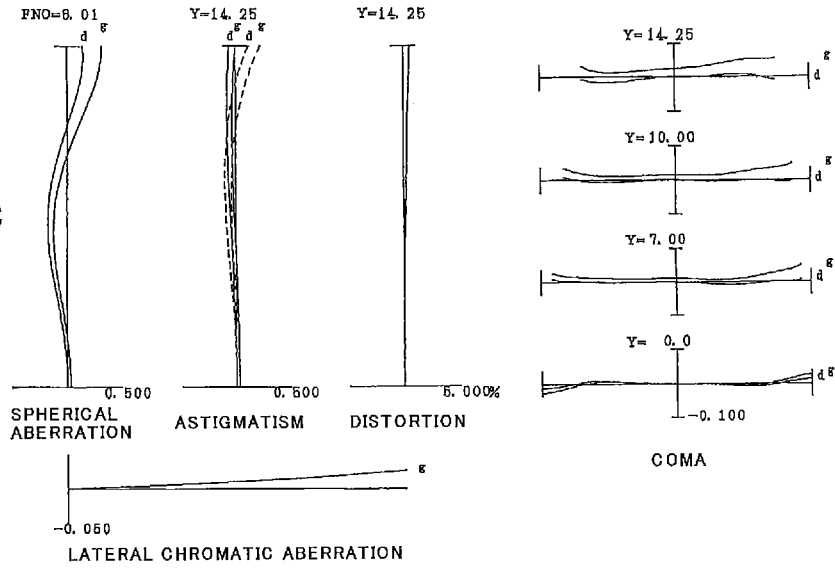

FIG. 12A, FIG. 12B and FIG. 12C are graphs showing various aberrations of the Sixth Example according to the present embodiment upon focusing on an infinite distance object, in which FIG. 12A shows various aberrations in a wide angle end state, FIG. 12B shows various aberrations in an intermediate focal length state, and FIG. 12C shows various aberrations in a telephoto end state.

As is apparent from the respective graphs, the variable magnification optical system according to the present Example shows superb optical performance as a result of good corrections to various aberrations from the wide-angle end state to the telephoto end state.

Seventh Example

Figure 13:
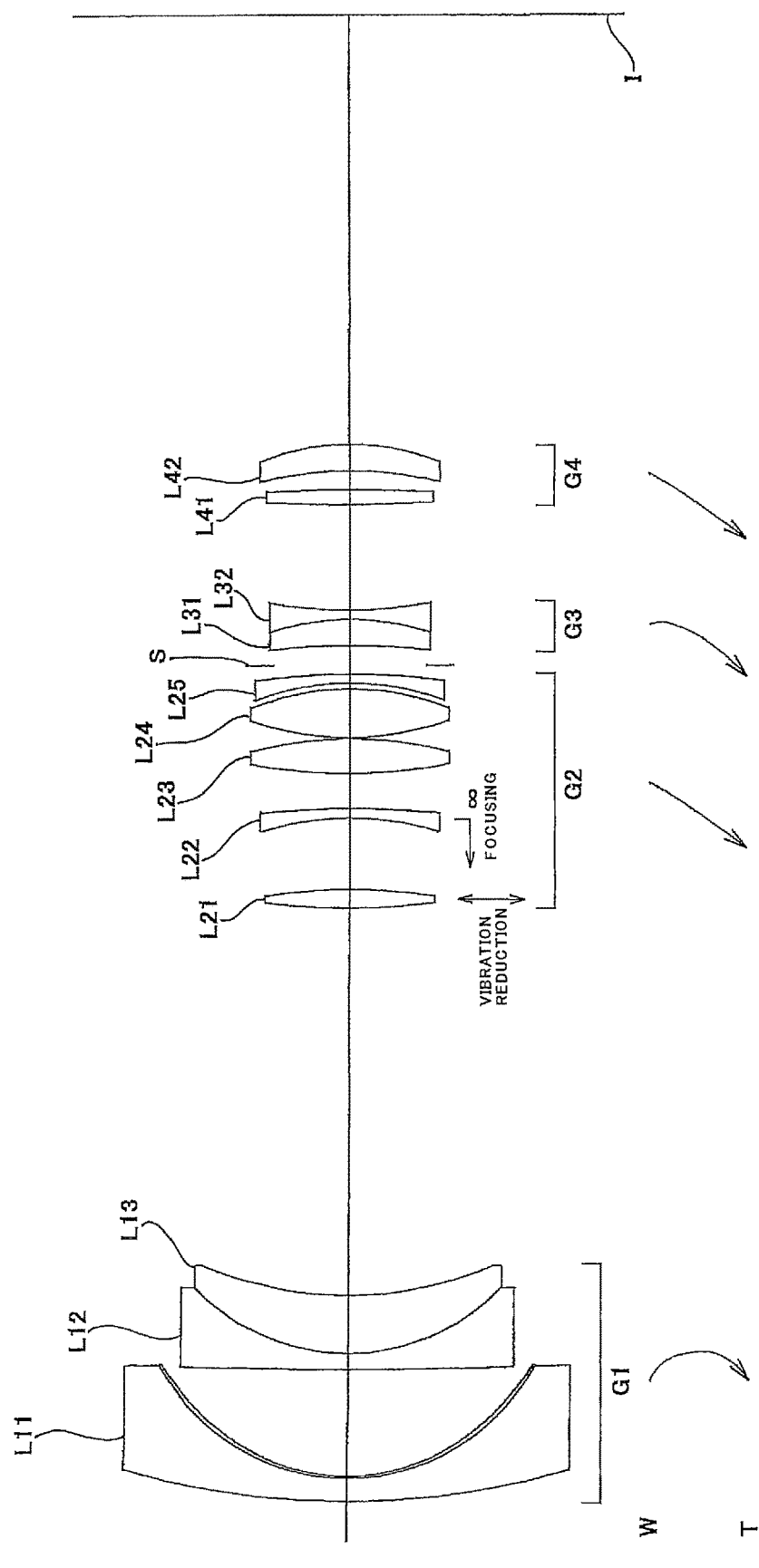
FIG. 13 is a sectional view showing a lens configuration of a variable magnification optical system in a wide angle end state according to a Seventh Example.

FIG. 13 is a sectional view showing a variable magnification optical system according to a Seventh Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power. Meanwhile, an aperture stop S is disposed between the second lens group G2 and the third lens group G3.

The rear group is composed of a fourth lens group G4 having positive refractive power, and has positive refractive power in an entire zooming range.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of, in order from the object side, a double convex positive lens L21, a negative meniscus lens L22 having a concave surface facing the object side, a double convex positive lens L23, a double convex positive lens L24 and a negative meniscus lens L45 having a concave surface facing the object side, and an aperture stop S.

The third lens group G3 consists of a cemented lens constructed by, in order from the object side, a positive meniscus lens L31 having a concave surface facing the object side cemented with a double concave negative lens L32.

The fourth lens group G4 consists of, in order from the object side, a double convex positive lens L41 and a positive meniscus lens L42 having a concave surface facing the object side. Meanwhile, the positive meniscus lens L41 is a plastic lens, and an image side lens surface of the positive meniscus lens L42 is formed with an aspherical surface.

In the variable magnification optical system according to the present Example, upon varying magnification from the wide angle end state to the telephoto end state, the first to the fourth lens groups G1-G4 are moved along the optical axis such that an air interval between the first lens group G1 and the second lens group G2, an air interval between the second lens group G2 and the third lens group G3, and an air interval between the third lens group G3 and the fourth lens group G4, are varied. In more detail, upon varying magnification, the second and the fourth lens groups G2 and G4 are moved together in a body. Meanwhile, upon varying magnification, the aperture stop S is moved together with the second lens group G2 in a body.

In the variable magnification optical system according to the present Example, focusing from an infinite distance object to a close distance object is carried out by moving the negative meniscus lens L22 in the second lens group G2 along the optical axis toward the object side.

In the variable magnification optical system according to the present Example, vibration reduction is carried out by moving the positive lens L21 in the second lens group G2 in a direction to have a component perpendicular to the optical axis.

Table 7 below shows various values of the variable magnification optical system according to the present Example.

TABLE 7

Seventh Example

[Surface Data]

| m | r | d | nd | νd |
|---|---|---|---|---|
| OP | ∞ | | | |
| 1 | 71.53 | 2.00 | 1.58913 | 61.22 |
| 2 | 18.88 | 0.17 | 1.56093 | 36.64 |
| *3 | 17.05 | 9.35 | 1.00000 | |
| 4 | 442.27 | 1.40 | 1.62299 | 58.12 |
| 5 | 18.94 | 5.00 | 1.84666 | 23.80 |
| 6 | 32.74 | variable | 1.00000 | |
| 7 | 58.18 | 1.65 | 1.48749 | 70.31 |
| 8 | −48.23 | 0.00 | 1.00000 | |
| 9 | −27.12 | 0.80 | 1.77250 | 49.62 |
| 10 | −87.64 | 2.96 | 1.00000 | |
| 11 | 44.86 | 3.05 | 1.48749 | 70.31 |
| 12 | −35.37 | 0.10 | 1.00000 | |
| 13 | 26.42 | 4.20 | 1.49782 | 82.57 |
| 14 | −24.88 | 0.50 | 1.00000 | |
| 15 | −24.79 | 0.80 | 1.85026 | 32.35 |
| 16 | −60.43 | 0.75 | 1.00000 | |
| 17(Stop S) | ∞ | variable | 1.00000 | |
| 18 | −66.48 | 2.27 | 1.75520 | 27.57 |
| 19 | −23.38 | 0.80 | 1.70154 | 41.02 |
| 20 | 38.98 | variable | 1.00000 | |
| 21 | 135.53 | 1.30 | 1.52444 | 56.21 |
| 22 | −100.00 | 1.60 | 1.00000 | |
| 23 | −34.76 | 2.30 | 1.51680 | 63.88 |
| *24 | −21.95 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.58111E−05 | 3.32055E−08 | −6.52732E−11 | 3.07200E−13 |
| 24 | 0.0000 | 2.92777E−05 | −5.70229E−08 | 5.23833E−09 | −5.90093E−11 |

[Various Data]
Variable Magnification Ratio 2.89

| | W | M | T |
|---|---|---|---|
| f | 18.50 | 35.00 | 53.40 |
| FNO | 3.61 | 4.46 | 5.83 |
| 2ω | 80.59 | 45.84 | 30.70 |
| TL | 128.48 | 123.03 | 131.75 |
| Y | 14.25 | 14.25 | 14.25 |
| d6 | 33.51 | 11.32 | 3.41 |
| d17 | 1.70 | 5.67 | 9.57 |
| d20 | 9.07 | 5.10 | 1.20 |
| Bf | 36.97 | 53.72 | 70.34 |
| GRf | 56.12 | 56.12 | 56.12 |

[Lens Group Data]

| Group | Starting surface | f |
|---|---|---|
| 1 | 1 | −23.66 |
| 2 | 7 | 25.83 |
| 3 | 18 | −36.53 |
| 4 | 21 | 56.12 |

[Values for Conditional Expressions]

(1) (−fn)/fp = 0.6989
(2) fG1/f1 = 1.6
(3) f2/(−f3) = 0.7070

Figure 14A:
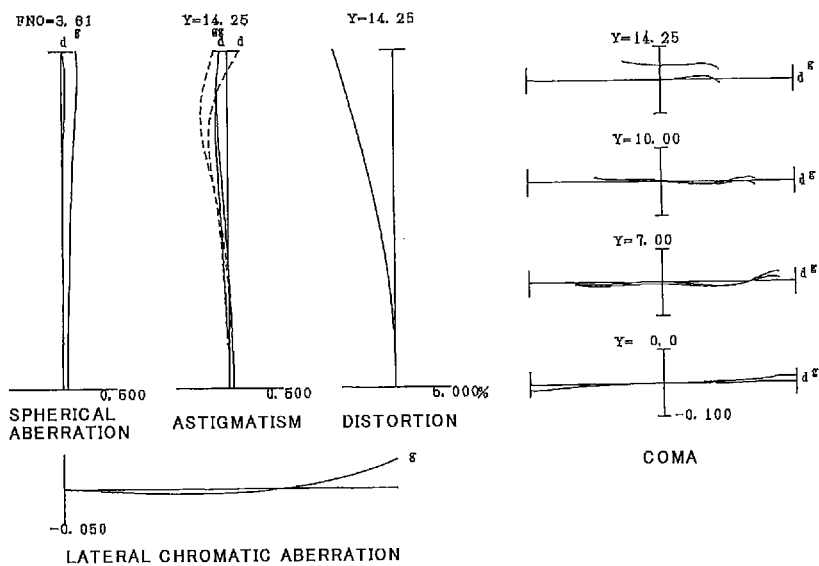
Figure 14B:
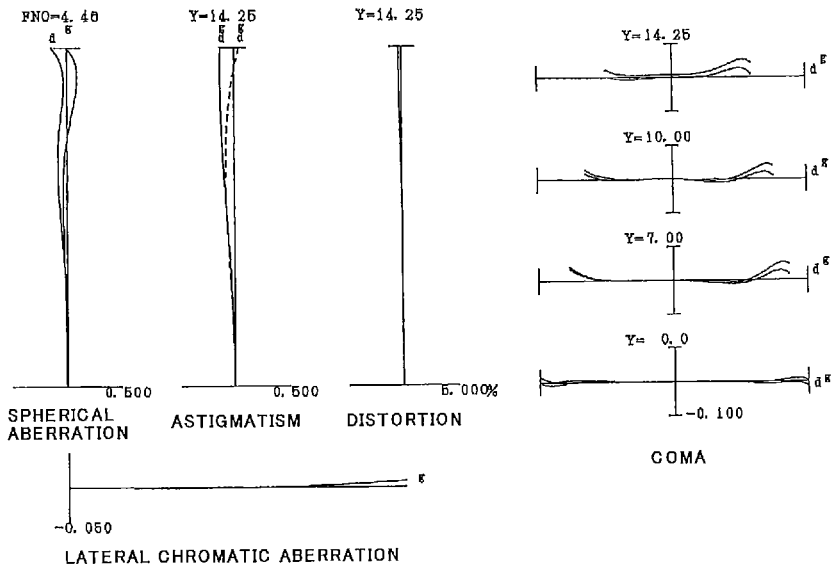
Figure 14C:
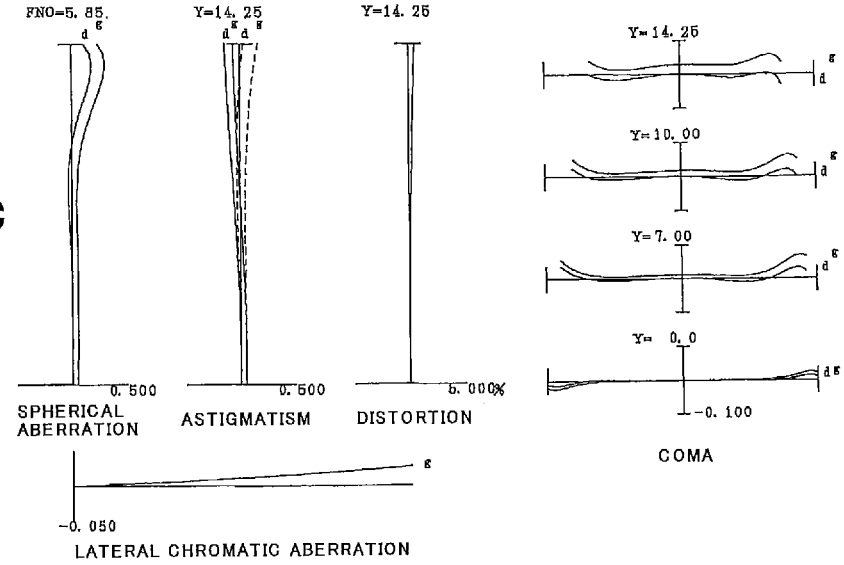

FIG. 14A, FIG. 14B and FIG. 14C are graphs showing various aberrations of the Seventh Example according to the present embodiment upon focusing on an infinite distance object, in which FIG. 14A shows various aberrations in a wide angle end state, FIG. 14B shows various aberrations in an intermediate focal length state, and FIG. 14C shows various aberrations in a telephoto end state.

As is apparent from the respective graphs, the variable magnification optical system according to the present Example shows superb optical performance as a result of good corrections to various aberrations from the wide-angle end state to the telephoto end state.

Eighth Example

Figure 15:
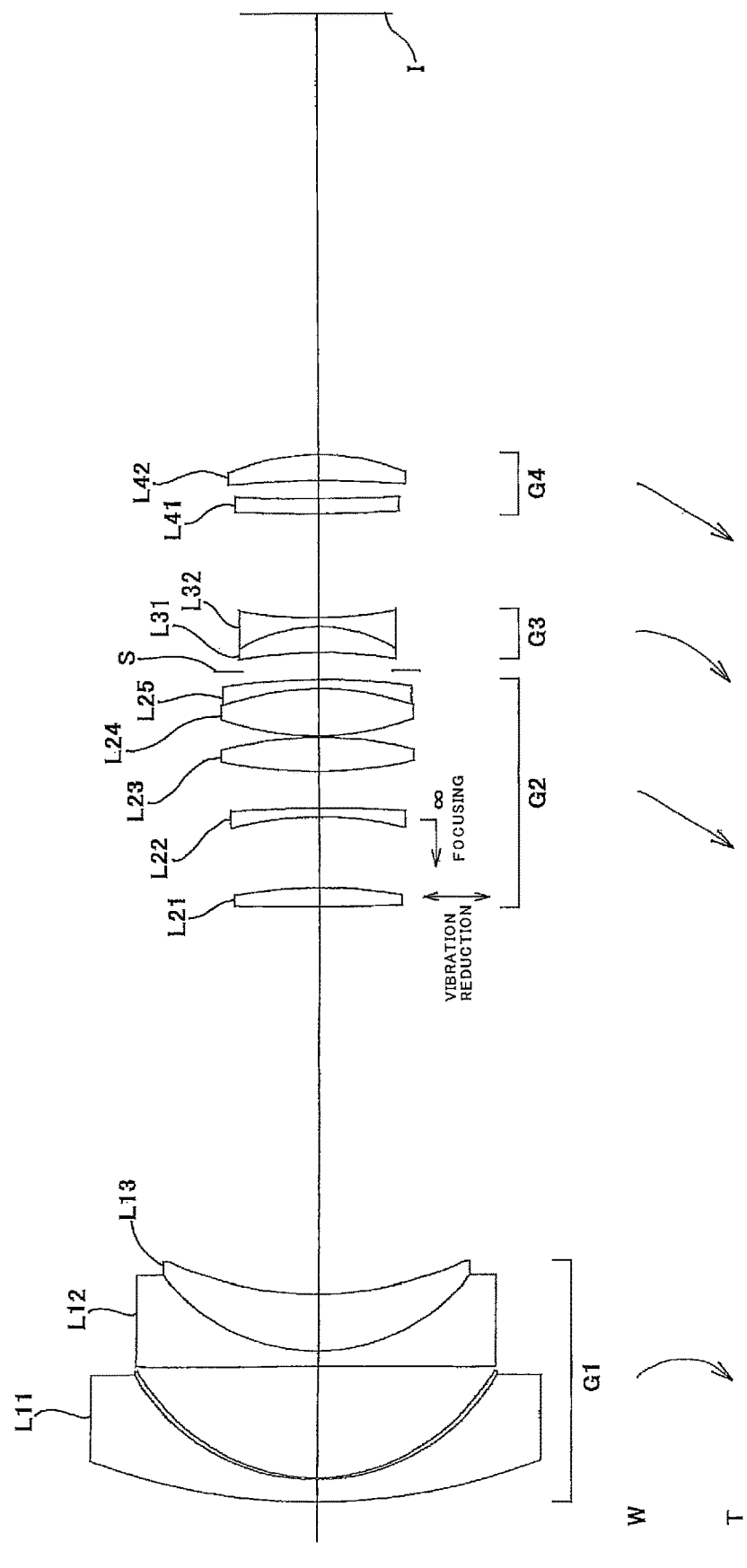
FIG. 15 is a sectional view showing a lens configuration of a variable magnification optical system in a wide angle end state according to an Eighth Example.

FIG. 15 is a sectional view showing a variable magnification optical system according to an Eighth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power. Meanwhile, an aperture stop S is disposed between the second lens group G2 and the third lens group G3.

The rear group is composed of a fourth lens group G4 having positive refractive power, and has positive refractive power in an entire zooming range.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of, in order from the object side, a double convex positive lens L21, a negative meniscus lens L22 having a concave surface facing the object side, a double convex positive lens L23, a cemented lens constructed by a double convex positive lens L24 cemented with a negative meniscus lens L25 having a concave surface facing the object side, and an aperture stop S.

The third lens group G3 consists of a cemented lens constructed by, in order from the object side, a positive meniscus lens L31 having a concave surface facing the object side cemented with a double concave negative lens L32.

The fourth lens group G4 consists of, in order from the object side, a positive meniscus lens L41 having a convex surface facing the object side and a positive meniscus lens L42 having a concave surface facing the object side. Meanwhile, the positive meniscus lens L41 is a plastic lens, and an image side lens surface thereof is formed with an aspherical surface.

In the variable magnification optical system according to the present Example, upon varying magnification from the wide angle end state to the telephoto end state, the first to the fourth lens groups G1-G4 are moved along the optical axis such that an air interval between the first lens group G1 and the second lens group G2, an air interval between the second lens group G2 and the third lens group G3, and an air interval between the third lens group G3 and the fourth lens group G4, are varied. In more detail, upon varying magnification, the second and the fourth lens groups G2 and G4 are moved together in a body. Meanwhile, upon varying magnification, the aperture stop S is moved together with the second lens group G2 in a body.

In the variable magnification optical system according to the present Example, focusing from an infinite distance object to a close distance object is carried out by moving the negative meniscus lens L22 in the second lens group G2 along the optical axis toward the object side.

In the variable magnification optical system according to the present Example, vibration reduction is carried out by moving the positive lens L21 in the second lens group G2 in a direction to have a component perpendicular to the optical axis.

Table 8 below shows various values of the variable magnification optical system according to the present Example.

TABLE 8

Eighth Example

[Surface Data]

| m | r | d | nd | νd |
|---|---|---|---|---|
| OP | ∞ | | | |
| 1 | 56.54 | 2.00 | 1.58913 | 61.22 |
| 2 | 18.89 | 0.17 | 1.56093 | 36.64 |
| *3 | 17.07 | 9.80 | 1.00000 | |
| 4 | 4680.27 | 1.40 | 1.62299 | 58.12 |
| 5 | 17.59 | 5.00 | 1.84666 | 23.80 |
| 6 | 32.17 | variable | 1.00000 | |
| 7 | 314.41 | 1.65 | 1.48749 | 70.31 |
| 8 | −43.40 | 6.28 | 1.00000 | |
| 9 | −33.68 | 0.80 | 1.77250 | 49.62 |
| 10 | −108.08 | 3.13 | 1.00000 | |
| 11 | 41.57 | 3.05 | 1.48749 | 70.31 |
| 12 | −34.99 | 0.10 | 1.00000 | |
| 13 | 25.27 | 4.20 | 1.48749 | 70.31 |
| 14 | −26.52 | 0.80 | 1.84666 | 23.80 |
| 15 | −67.76 | 0.75 | 1.00000 | |
| 16(Stop S) | ∞ | variable | 1.00000 | |
| 17 | −45.11 | 2.27 | 1.75520 | 27.57 |
| 18 | −14.01 | 0.80 | 1.70154 | 41.02 |
| 19 | 39.30 | variable | 1.00000 | |
| 20 | 121.72 | 1.30 | 1.53110 | 55.91 |
| *21 | 199.72 | 1.60 | 1.00000 | |
| 22 | −110.04 | 2.30 | 1.51680 | 63.88 |
| 23 | −21.37 | Bf | 1.00000 | |
| Image plane | ∞ | | | |

TABLE 8-continued

Eighth Example

[Aspherical Data]

| m | κ | A4 | A6 | A8 | A10 |
|---|---|---|---|---|---|
| 3 | 0.0000 | 1.62830E−05 | 4.23083E−08 | −1.01669E−10 | 4.96506E−13 |
| 21 | 0.0000 | 2.44938E−05 | 4.06380E−08 | −6.00632E−10 | 2.19027E−12 |

[Various Data]
Variable Magnification Ratio 2.89

| | W | M | T |
|---|---|---|---|
| f | 18.50 | 35.00 | 53.40 |
| FNO | 3.63 | 4.61 | 5.88 |
| 2ω | 80.56 | 45.83 | 30.69 |
| TL | 136.02 | 128.87 | 136.72 |
| Y | 14.25 | 14.25 | 14.25 |
| d6 | 34.08 | 10.90 | 2.85 |
| d16 | 1.61 | 5.51 | 9.36 |
| d19 | 9.05 | 5.14 | 1.29 |
| Bf | 43.89 | 59.91 | 75.81 |
| GRf | 47.21 | 47.21 | 47.21 |

[Lens Group Data]

| Group | Starting surface | f |
|---|---|---|
| 1 | 1 | −24.60 |
| 2 | 7 | 26.10 |
| 3 | 17 | −32.08 |
| 4 | 20 | 47.21 |

[Values for Conditional Expressions]

(1) (−fn)/fp = 0.7156
(2) fG1/f1 = 1.7
(3) f2/(−f3) = 0.8136

Figure 16A:
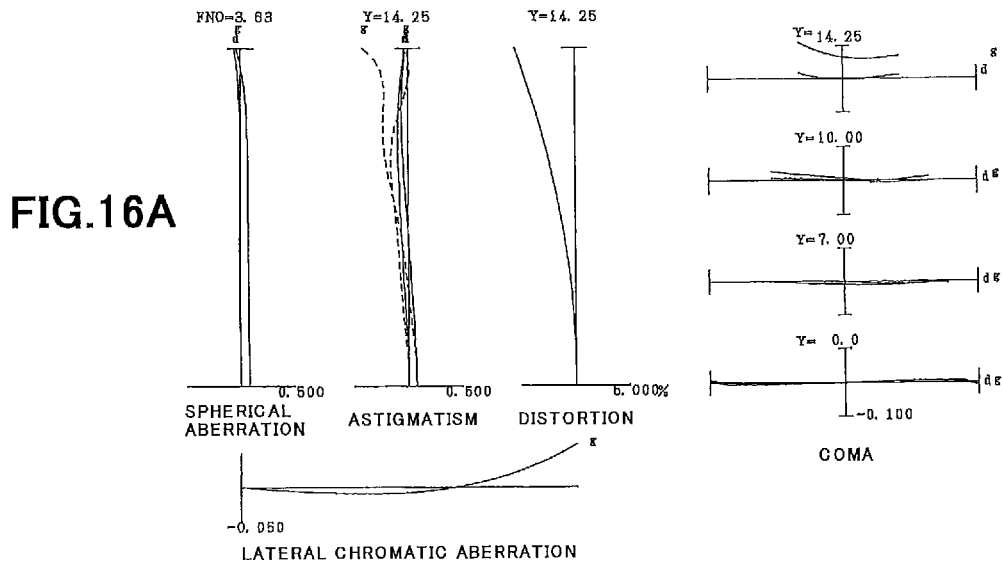
Figure 16B:
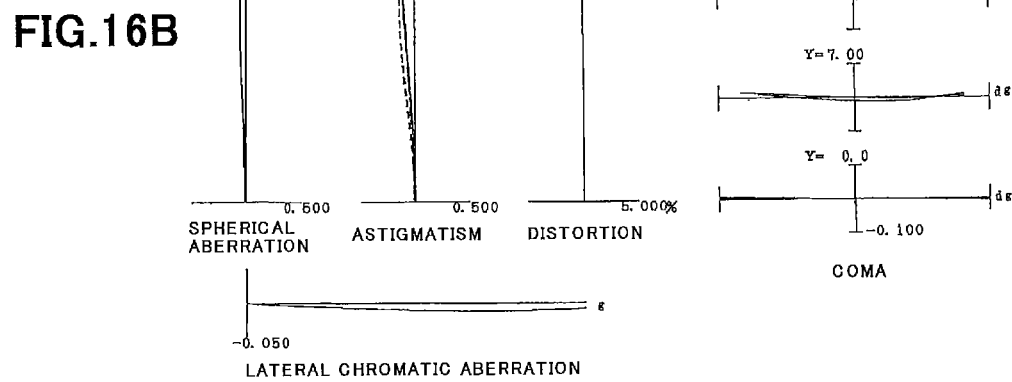
Figure 16C:
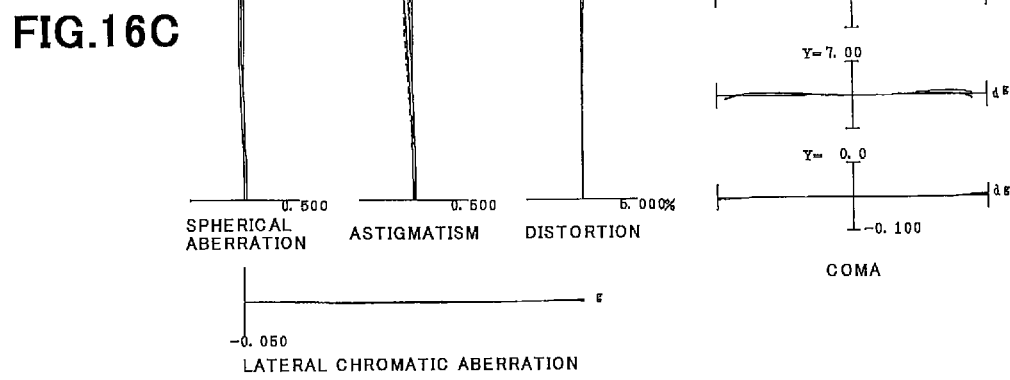

FIG. 16A, FIG. 16B and FIG. 16C are graphs showing various aberrations of the Eighth Example according to the present embodiment upon focusing on an infinite distance object, in which FIG. 16A shows various aberrations in a wide angle end state, FIG. 16B shows various aberrations in an intermediate focal length state, and FIG. 16C shows various aberrations in a telephoto end state.

As is apparent from the respective graphs, the variable magnification optical system according to the present Example shows superb optical performance as a result of good corrections to various aberrations from the wide-angle end state to the telephoto end state.

Ninth Example

Figure 17:
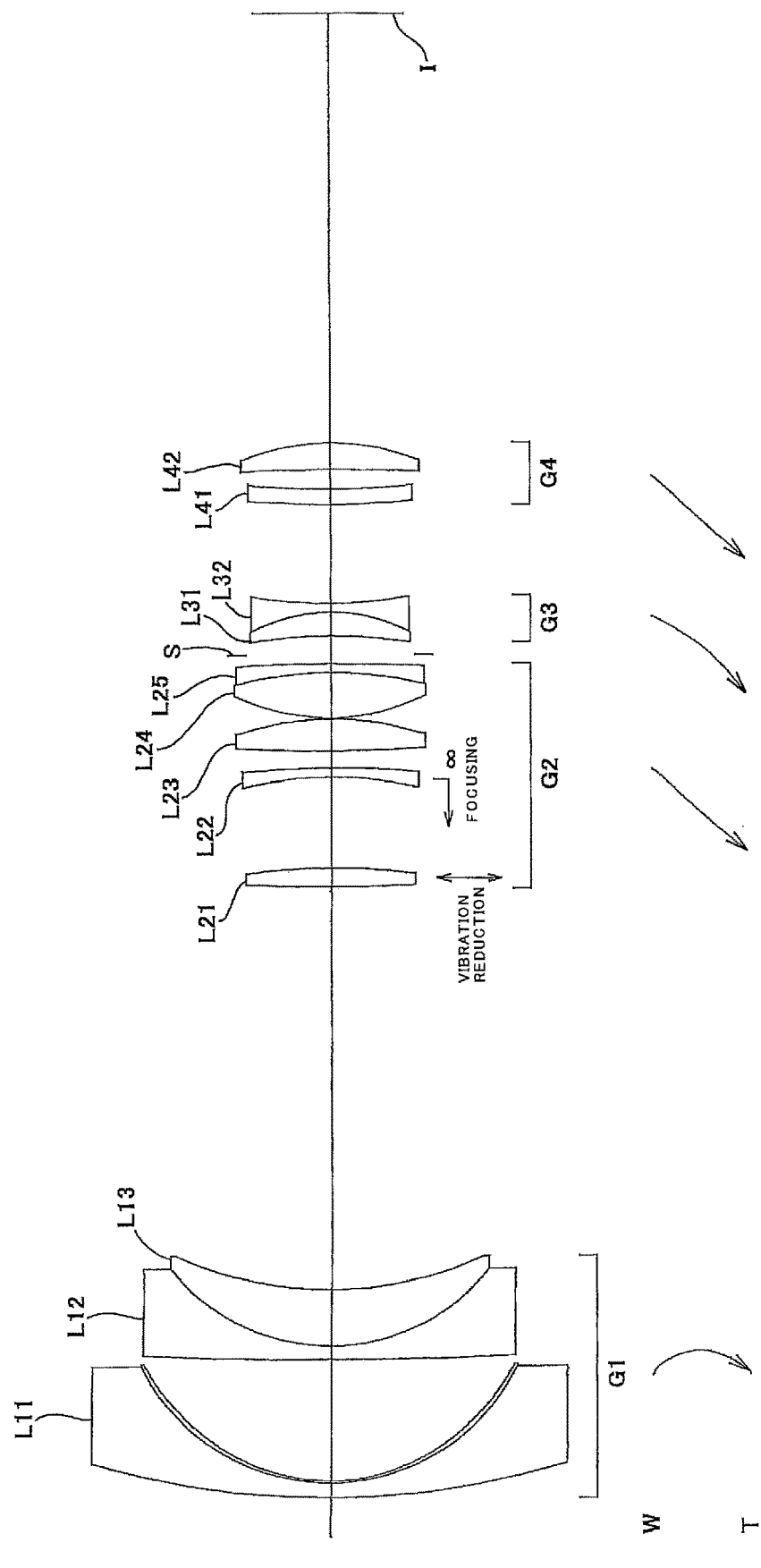
FIG. 17 is a sectional view showing a lens configuration of a variable magnification optical system in a wide angle end state according to a Ninth Example.

FIG. 17 is a sectional view showing a variable magnification optical system according to a Ninth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power. Meanwhile, an aperture stop S is disposed between the second lens group G2 and the third lens group G3.

The rear group is composed of a fourth lens group G4 having positive refractive power, and has positive refractive power in an entire zooming range.

The first lens group G1 consists of, in order from the object side, a negative meniscus lens L11 having a convex surface facing the object side, and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of, in order from the object side, a double convex positive lens L21, a negative meniscus lens L22 having a concave surface facing the object side, a double convex positive lens L23, a cemented lens constructed by a double convex positive lens L24 cemented with a negative meniscus lens L25 having a concave surface facing the object side, and an aperture stop S.

The third lens group G3 consists of a cemented lens constructed by, in order from the object side, a positive meniscus lens L31 having a concave surface facing the object side cemented with a double concave negative lens L32.

The fourth lens group G4 consists of, in order from the object side, a positive meniscus lens L41 having a convex surface facing the object side and a positive meniscus lens L42 having a concave surface facing the object side. Meanwhile, the positive meniscus lens L41 is a plastic lens, and an image side lens surface of the positive meniscus lens L42 is formed with an aspherical surface.

In the variable magnification optical system according to the present Example, upon varying magnification from the wide angle end state to the telephoto end state, the first to the fourth lens groups G1-G4 are moved along the optical axis such that an air interval between the first lens group G1 and the second lens group G2, an air interval between the second lens group G2 and the third lens group G3, and an air interval between the third lens group G3 and the fourth lens group G4, are varied. In more detail, upon varying magnification, the second and fourth lens groups G2 and G4 are moved together in a body. Meanwhile, upon varying magnification, the aperture stop S is moved together with the second lens group G2 in a body.

In the variable magnification optical system according to the present Example, focusing from an infinite distance object to a close distance object is carried out by moving the negative meniscus lens L22 in the second lens group G2 along the optical axis toward the object side.

In the variable magnification optical system according to the present Example, vibration reduction is carried out by moving the positive lens L21 in the second lens group G2 in a direction to have a component perpendicular to the optical axis.

Table 9 below shows various values of the variable magnification optical system according to the present Example.

TABLE 9

Ninth Example

[Surface Data]

| m | r | d | nd | νd |
|---|---|---|---|---|
| OP | ∞ | | | |
| 1 | 76.10 | 1.30 | 1.51680 | 63.88 |
| 2 | 19.00 | 0.15 | 1.56093 | 36.64 |
| *3 | 17.00 | 10.80 | 1.00000 | |
| 4 | 352.67 | 1.20 | 1.63854 | 55.34 |
| 5 | 18.36 | 5.00 | 1.84666 | 23.80 |
| 6 | 33.84 | variable | 1.00000 | |
| 7 | 120.63 | 1.70 | 1.48749 | 70.31 |
| 8 | −59.23 | 0.00 | 1.00000 | |
| 9 | −35.23 | 0.79 | 1.77250 | 49.62 |
| 10 | −98.25 | 1.50 | 1.00000 | |
| 11 | 136.12 | 2.80 | 1.48749 | 70.31 |
| 12 | −27.24 | 0.10 | 1.00000 | |
| 13 | 19.98 | 4.00 | 1.48749 | 70.31 |
| 14 | −36.18 | 0.80 | 1.84666 | 23.80 |
| 15 | −160.37 | 0.75 | 1.00000 | |
| 16(Stop S) | ∞ | variable | 1.00000 | |
| 17 | −46.91 | 2.10 | 1.75520 | 27.57 |
| 18 | −15.49 | 0.75 | 1.70154 | 41.02 |
| 19 | 40.10 | variable | 1.00000 | |
| 20 | 85.01 | 1.37 | 1.52444 | 56.21 |
| 21 | 100.01 | 1.71 | 1.00000 | |
| 22 | −176.72 | 2.30 | 1.51680 | 63.88 |
| *23 | −21.86 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.50225E−05 | 4.72449E−08 | −1.16195E−10 | 4.13814E−13 |
| 23 | 0.0000 | 2.50198E−05 | −1.55055E−08 | 3.95374E−10 | −4.11533E−12 |

[Various Data]
Variable Magnification Ratio 2.89

| | W | M | T |
|---|---|---|---|
| f | 18.50 | 35.00 | 53.40 |
| FNO | 3.52 | 4.55 | 5.88 |
| 2ω | 80.58 | 45.86 | 30.70 |
| TL | 136.43 | 128.85 | 136.58 |
| Y | 14.25 | 14.25 | 14.25 |
| d6 | 35.48 | 11.33 | 2.99 |
| d16 | 1.70 | 5.32 | 9.14 |
| d19 | 8.68 | 5.06 | 1.24 |
| Bf | 43.45 | 60.02 | 76.10 |
| GRf | 46.32 | 46.32 | 46.32 |

[Lens Group Data]

| Group | Starting surface | f |
|---|---|---|
| 1 | 1 | −25.51 |
| 2 | 7 | 27.03 |
| 3 | 17 | −32.79 |
| 4 | 20 | 46.32 |

TABLE 9-continued

Ninth Example

[Values for Conditional Expressions]

(1) (−fn)/fp = 0.7355
(2) fG1/f1 = 1.7
(3) f2/(−f3) = 0.8245

Figure 18A:
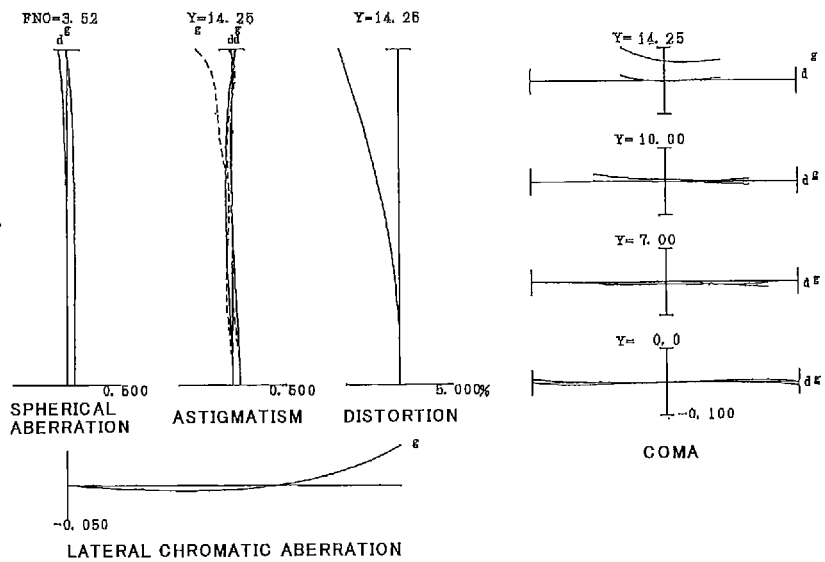
Figure 18B:
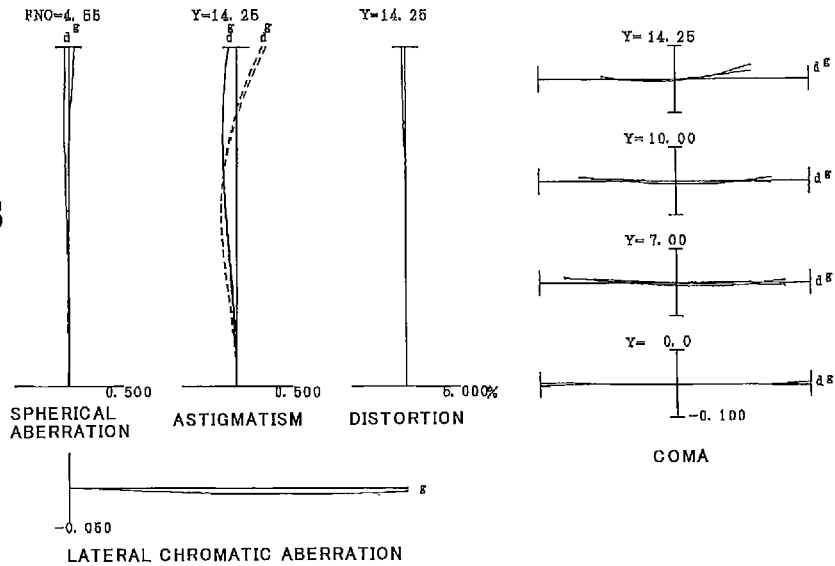
Figure 18C:
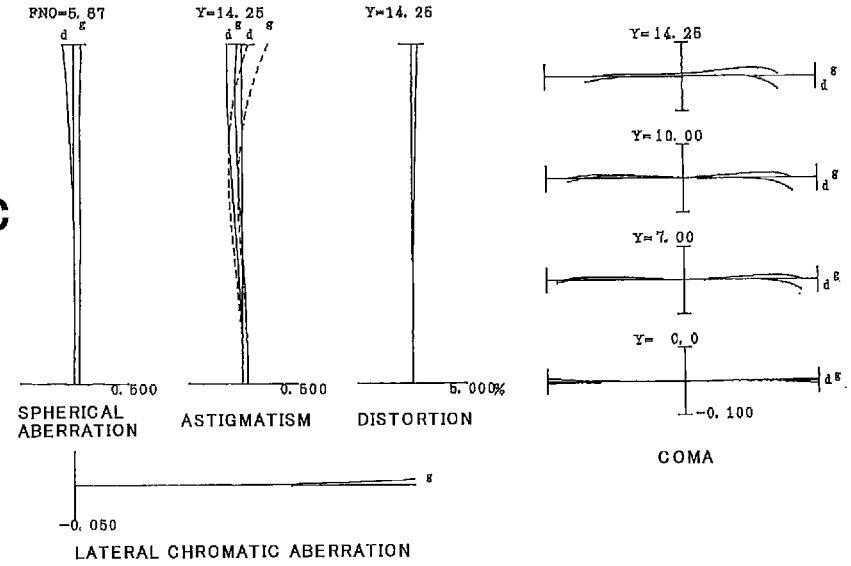

FIG. 18A, FIG. 18B and FIG. 18C are graphs showing various aberrations of the Ninth Example according to the present embodiment upon focusing on an infinite distance object, in which FIG. 18A shows various aberrations in a wide angle end state, FIG. 18B shows various aberrations in an intermediate focal length state, and FIG. 18C shows various aberrations in a telephoto end state.

As is apparent from the respective graphs, the variable magnification optical system according to the present Example shows superb optical performance as a result of good corrections to various aberrations from the wide-angle end state to the telephoto end state.

Tenth Example

Figure 19:
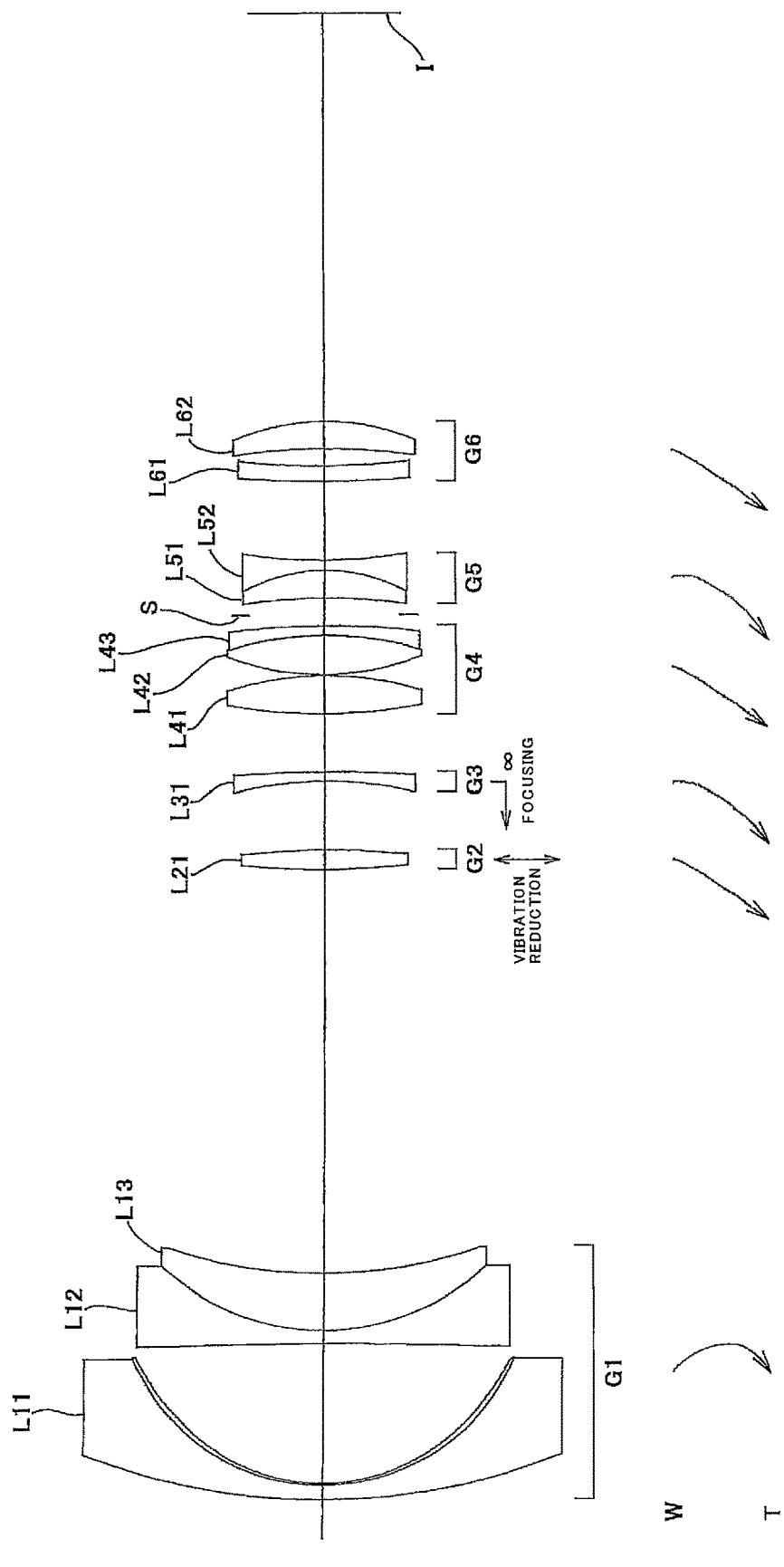
FIG. 19 is a sectional view showing a lens configuration of a variable magnification optical system in a wide angle end state according to a Tenth Example.

FIG. 19 is a sectional view showing a variable magnification optical system according to a Tenth Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power, and a rear group having positive refractive power.

The rear group is composed of, in order from the object side, a fourth lens group G4 having positive refractive power, a fifth lens group G5 having negative refractive power, and a sixth lens group G6 having positive refractive power, and has positive refractive power in an entire zooming range. Meanwhile, an aperture stop S is disposed between the fourth lens group G4 and the fifth lens group G5.

The first lens group G1 consists of, in order from the object side, a negative meniscus lens L11 having a convex surface facing the object side, and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a double convex positive lens L21.

The third lens group G3 consists of a negative meniscus lens L31 having a concave surface facing the object side.

The fourth lens group G4 consists of, in order from the object side, a double convex positive lens L41, and a cemented lens constructed by a double convex positive lens L42 cemented with a negative meniscus lens L43 having a concave surface facing the object side.

The fifth lens group G5 consists of, in order from the object side, an aperture stop S and a cemented lens constructed by a positive meniscus lens L51 having a concave surface facing the object side cemented with a double concave negative lens L52.

The sixth lens group G6 consists of, in order from the object side, a negative meniscus lens L61 having a convex surface facing the object side and a positive meniscus lens L62 having a concave surface facing the object side. Meanwhile, the negative lens L61 is a plastic lens, of which an image side lens surface is an aspherical surface.

In the variable magnification optical system according to the present Example, upon varying magnification from the wide angle end state to the telephoto end state, the first to the sixth lens groups G1-G6 are moved along the optical axis such that an air interval between the first lens group G1 and the second lens group G2, an air interval between the second lens group G2 and the third lens group G3, an air interval between the third lens group G3 and the fourth lens group G4, an air interval between the fourth lens group G4 and the fifth lens group G5, and an air interval between the fifth lens group G5 and the sixth lens group G6 are varied. More in detail, upon varying magnification, the second, the fourth, and the sixth lens groups G2, G4 and G6 are moved together in a body. Meanwhile, upon varying magnification, the aperture stop S is moved together with the fifth lens group G5 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 10 below shows various values of the variable magnification optical system according to the present Example.

TABLE 10

Tenth Example

[Surface Data]

| m | r | d | nd | vd |
|---|---|---|---|---|
| OP | ∞ | | | |
| 1 | 58.61 | 1.30 | 1.51680 | 63.88 |
| 2 | 18.70 | 0.15 | 1.56093 | 36.64 |
| *3 | 16.70 | 12.36 | 1.00000 | |
| 4 | −539.76 | 1.20 | 1.63854 | 55.34 |

TABLE 10-continued

| Tenth Example | | | | |
|---|---|---|---|---|
| 5 | 21.43 | 5.00 | 1.84666 | 23.78 |
| 6 | 43.93 | variable | 1.00000 | |
| 7 | 76.20 | 1.70 | 1.48749 | 70.31 |
| 8 | -74.28 | variable | 1.00000 | |
| 9 | -33.55 | 0.79 | 1.77250 | 49.62 |
| 10 | -126.41 | variable | 1.00000 | |
| 11 | 49.80 | 3.33 | 1.48749 | 70.31 |
| 12 | -30.52 | 0.10 | 1.00000 | |
| 13 | 23.62 | 3.51 | 1.48749 | 70.31 |
| 14 | -29.49 | 0.80 | 1.84666 | 23.80 |
| 15 | -75.25 | variable | 1.00000 | |
| 16(Stop S) | ∞ | 1.50 | 1.00000 | |
| 17 | -51.95 | 2.42 | 1.75520 | 27.57 |
| 18 | -15.57 | 0.90 | 1.70154 | 41.02 |
| 19 | 45.98 | variable | 1.00000 | |
| 20 | 96.48 | 1.37 | 1.52444 | 56.21 |
| *21 | 88.50 | 1.50 | 1.00000 | |
| 22 | -58.97 | 2.38 | 1.51680 | 63.88 |
| 23 | -21.70 | Bf | 1.00000 | |
| Image plane | ∞ | | | |

| [Aspherical Data] | | | | | |
|---|---|---|---|---|---|
| m | κ | A4 | A6 | A8 | A10 |
| 3 | 0.0000 | 1.72915E-05 | 4.86464E-08 | -1.24525E-10 | 4.71298E-13 |
| 21 | 0.0000 | 3.10082E-05 | 1.62502E-09 | -1.14900E-10 | 1.87133E-13 |

| [Various Data] Variable Magnification Ratio 2.89 | | | |
|---|---|---|---|
| | W | M | T |
| f | 18.50 | 35.00 | 53.40 |
| FNO | 3.64 | 4.70 | 5.84 |
| 2ω | 80.61 | 45.83 | 30.72 |
| TL | 135.29 | 129.95 | 136.93 |
| Y | 14.25 | 14.25 | 14.25 |
| d6 | 35.50 | 13.00 | 3.00 |
| d8 | 6.10 | 9.67 | 10.06 |
| d10 | 5.11 | 1.55 | 1.15 |
| d15 | 0.95 | 3.60 | 6.50 |
| d19 | 6.85 | 4.20 | 1.30 |
| Bf | 40.47 | 57.64 | 74.61 |
| GRf | 31.76 | 29.91 | 27.89 |

| [Lens Group Data] | | |
|---|---|---|
| Group | Starting surface | f |
| 1 | 1 | -27.41 |
| 2 | 7 | 77.45 |
| 3 | 9 | -59.34 |
| 4 | 11 | 22.44 |
| 5 | 17 | -37.49 |
| 6 | 20 | 67.25 |

| [Values for Conditional Expressions] | |
|---|---|
| (1) | (-fn)/fp = 0.7192 |
| (2) | fG1/f1 = 1.6 |
| (3) | f2/(-f3) = 1.3051 |

Figure 20A:
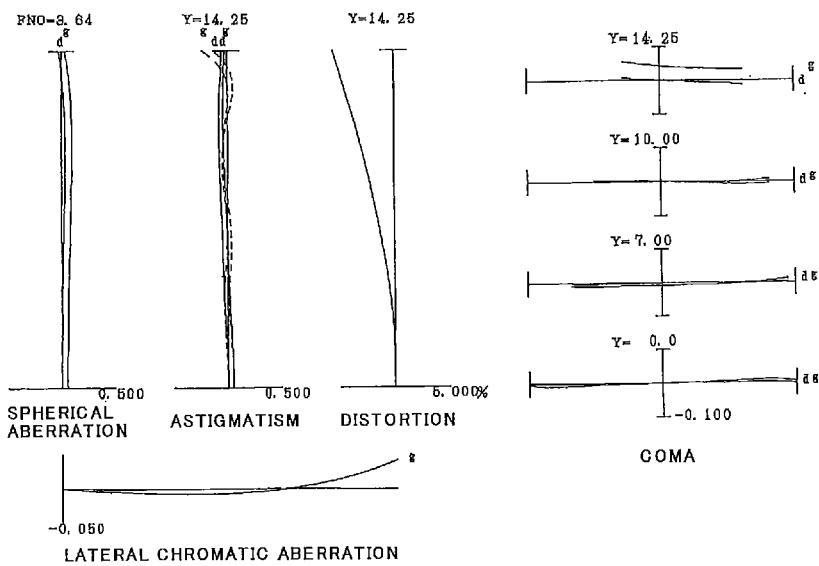
Figure 20B:
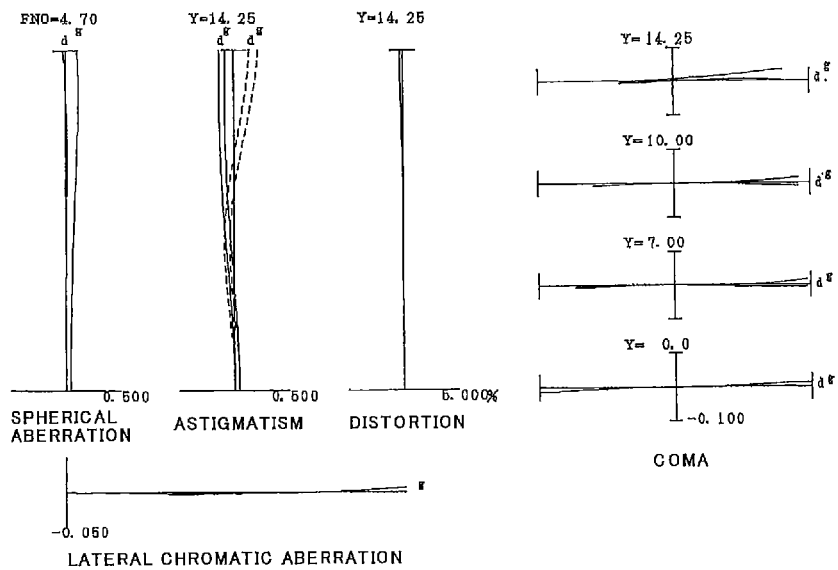
Figure 20C:
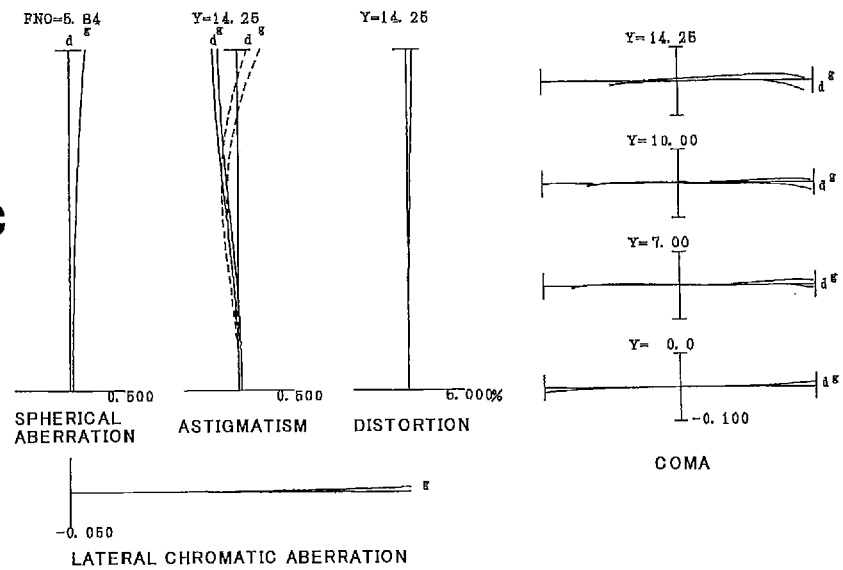

FIG. 20A, FIG. 20B and FIG. 20C are graphs showing various aberrations of the Tenth Example according to the present embodiment upon focusing on an infinite distance object, in which FIG. 20A shows various aberrations in a wide angle end state, FIG. 20B shows various aberrations in an intermediate focal length state, and FIG. 20C shows various aberrations in a telephoto end state.

As is apparent from the respective graphs, the variable magnification optical system according to the present Example shows superb optical performance as a result of good corrections to various aberrations from the wide-angle end state to the telephoto end state.

Eleventh Example

Figure 21:
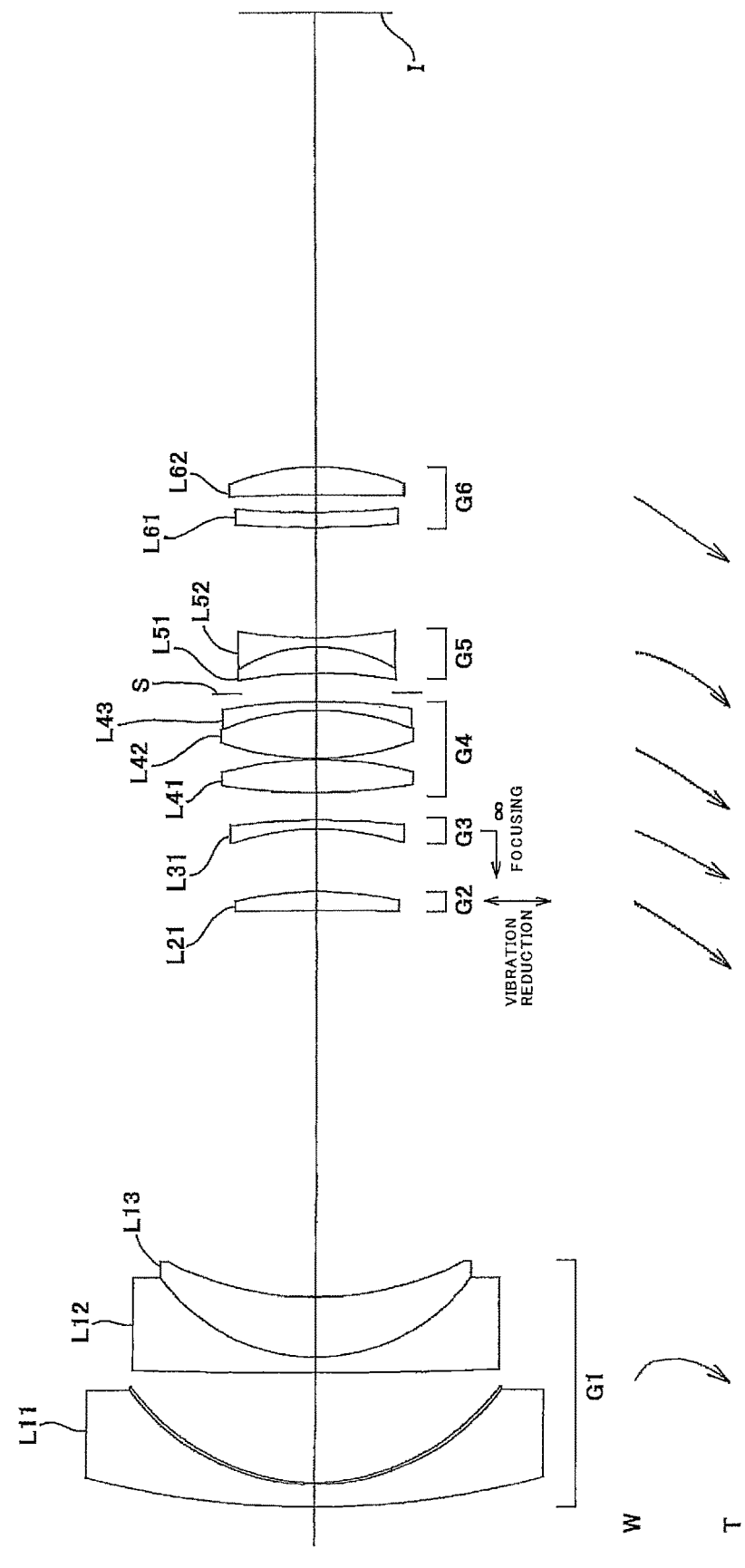
FIG. 21 is a sectional view showing a lens configuration of a variable magnification optical system in a wide angle end state according to an Eleventh Example.

FIG. 21 is a sectional view showing a variable magnification optical system according to an Eleventh Example of the present embodiment in the wide angle end state.

The variable magnification optical system according to the present Example is composed of, in order from an object side, a first lens group G1 having negative refractive power, a second lens group G2 having positive refractive power, a third lens group G3 having negative refractive power and a rear group having positive refractive power.

The rear group is composed of, in order from the object side, a fourth lens group G4 having positive refractive power, a fifth lens group G5 having negative refractive power and a sixth lens group G6 having positive refractive power, and has positive refractive power in an entire zooming range. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a negative meniscus lens L12 having a convex surface facing the object side cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side, and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a negative meniscus lens L61 having a convex surface facing the object side and a positive meniscus lens L62 having a concave surface facing the object side. Meanwhile, the negative lens L61 is a plastic lens, of which an image side lens surface is an aspherical surface.

In the variable magnification optical system according to the present Example, upon varying magnification from the wide angle end state to the telephoto end state, the first to the sixth lens groups G1-G6 are moved along the optical axis such that an air interval between the first lens group G1 and the second lens group G2, an air interval between the second lens group G2 and the third lens group G3, an air interval between the third lens group G3 and the fourth lens group G4, an air interval between the fourth lens group G4 and the fifth lens group G5, and an air interval between the fifth lens group G5 and the sixth lens group G6 are varied. Meanwhile, upon varying magnification, the aperture stop S is moved together with the fourth lens group G4 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 11 below shows various values of the variable magnification optical system according to the present Example.

TABLE 11

Eleventh Example

[Surface Data]

| m | r | d | nd | νd |
|---|---|---|---|---|
| OP | ∞ | | | |
| 1 | 79.69 | 2.00 | 1.58913 | 61.22 |
| 2 | 20.75 | 0.17 | 1.56093 | 36.64 |
| *3 | 19.00 | 9.65 | 1.00000 | |
| 4 | 416.05 | 1.40 | 1.60311 | 60.69 |
| 5 | 17.31 | 5.19 | 1.84666 | 23.80 |
| 6 | 28.95 | variable | 1.00000 | |
| 7 | −396.42 | 1.63 | 1.48749 | 70.31 |
| 8 | −34.31 | variable | 1.00000 | |
| 9 | −24.55 | 0.80 | 1.77250 | 49.62 |
| 10 | −67.66 | variable | 1.00000 | |
| 11 | 53.51 | 2.86 | 1.60311 | 60.69 |
| 12 | −36.03 | 0.10 | 1.00000 | |
| 13 | 26.08 | 4.26 | 1.48749 | 70.31 |
| 14 | −23.14 | 0.80 | 1.84666 | 23.80 |
| 15 | −52.27 | 0.75 | 1.00000 | |
| 16(Stop S) | ∞ | variable | 1.00000 | |
| 17 | −45.51 | 2.28 | 1.84666 | 23.80 |
| 18 | −14.24 | 0.80 | 1.74950 | 35.25 |
| 19 | 41.61 | variable | 1.00000 | |
| 20 | 100.00 | 1.30 | 1.52444 | 56.21 |
| *21 | 97.03 | 1.55 | 1.00000 | |
| 22 | −306.68 | 2.44 | 1.48749 | 70.31 |
| 23 | −21.59 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 9.56997E−06 | 2.46213E−08 | −3.67381E−11 | 1.68777E−13 |
| 21 | 0.0000 | 2.66274E−05 | 2.95181E−08 | −8.46694E−11 | −4.35134E−12 |

TABLE 11-continued

Eleventh Example

[Various Data]
Variable Magnification Ratio 2.89

|     | W      | M      | T      |
| --- | ------ | ------ | ------ |
| f   | 18.50  | 35.00  | 53.40  |
| FNO | 3.64   | 4.60   | 5.88   |
| 2ω  | 80.59  | 45.80  | 30.69  |
| TL  | 134.92 | 128.32 | 136.32 |
| Y   | 14.25  | 14.25  | 14.25  |
| d6  | 33.91  | 11.51  | 3.67   |
| d8  | 5.54   | 6.25   | 6.51   |
| d10 | 2.36   | 1.94   | 1.78   |
| d16 | 1.70   | 5.75   | 9.71   |
| d19 | 9.61   | 5.26   | 1.20   |
| Bf  | 43.82  | 59.63  | 75.47  |
| GRf | 31.12  | 28.57  | 25.87  |

[Lens Group Data]

| Group | Starting surface | f |
| --- | --- | --- |
| 1 | 1 | −24.72 |
| 2 | 7 | 76.93 |
| 3 | 9 | −50.29 |
| 4 | 11 | 21.61 |
| 5 | 17 | −33.17 |
| 6 | 20 | 48.02 |

[Values for Conditional Expressions]

(1)  (−fn)/fp = 0.7099
(2)  fG1/f1 = 1.7
(3)  f2/(−f3) = 1.5299

Figure 22A:
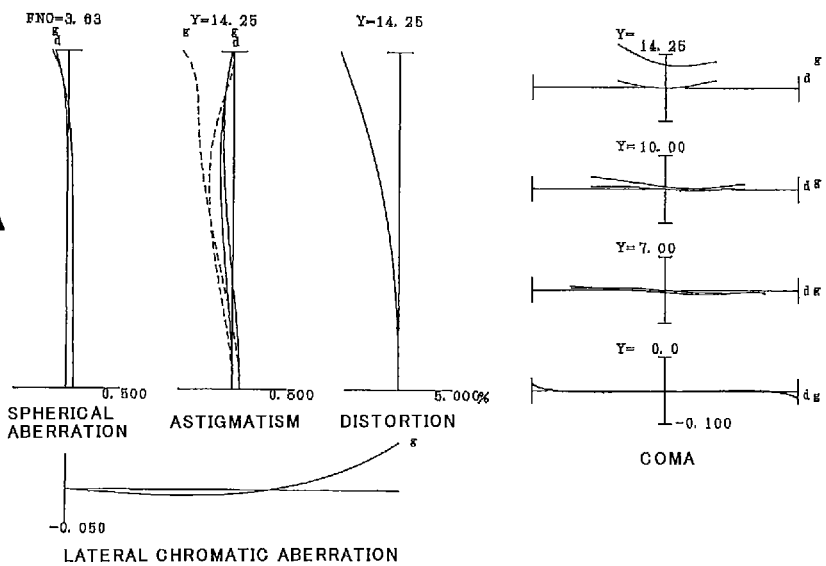
Figure 22B:
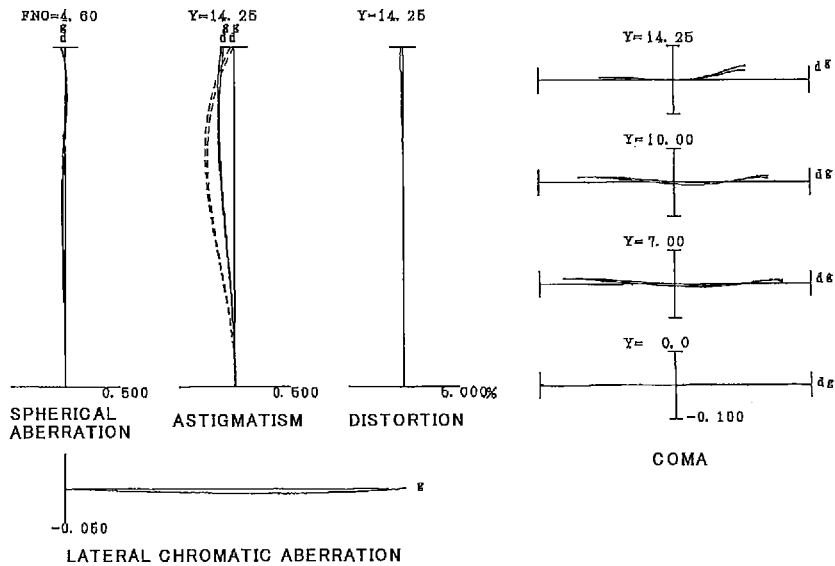
Figure 22C:
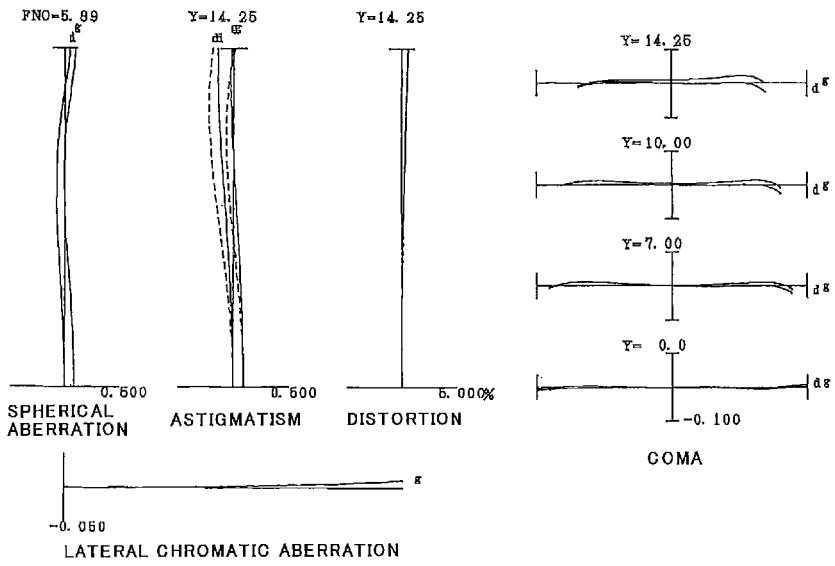

FIG. 22A, FIG. 22B and FIG. 22C are graphs showing various aberrations of the Eleventh Example according to the present embodiment upon focusing on an infinite distance object, in which FIG. 22A shows various aberrations in a wide angle end state, FIG. 22B shows various aberrations in an intermediate focal length state, and FIG. 22C shows various aberrations in a telephoto end state.

As is apparent from the respective graphs, the variable magnification optical system according to the present Example shows superb optical performance as a result of good corrections to various aberrations from the wide-angle end state to the telephoto end state.

Twelfth Example

Figure 23:
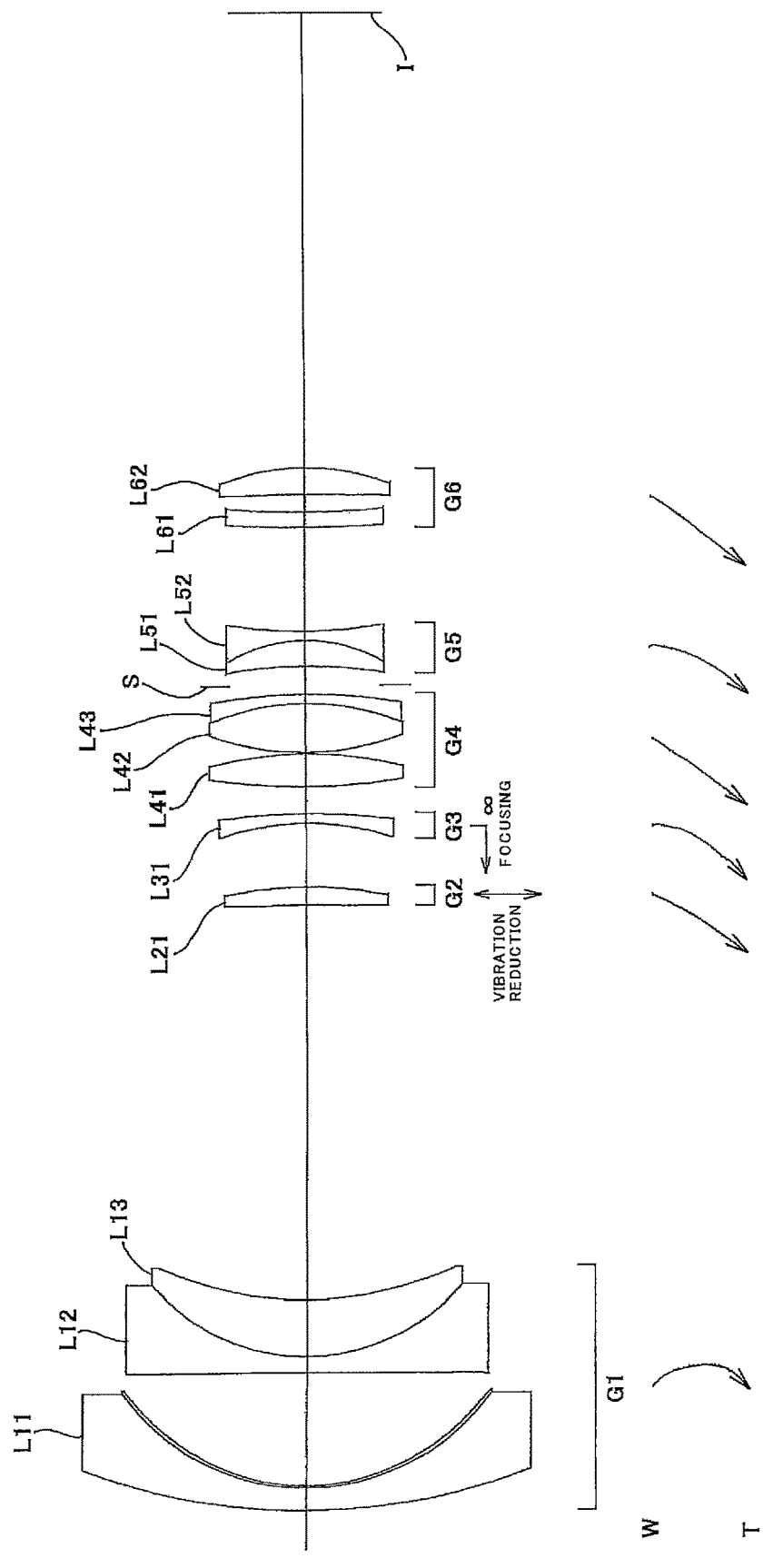
FIG. 23 is a sectional view showing a lens configuration of a variable magnification optical system in a wide angle end state according to a Twelfth Example.

FIG. 23 is a sectional view showing a variable magnification optical system according to a Twelfth Example of the present embodiment at the wide angle end state.

The variable magnification optical system according to the present Example is composed of, in order from an object side, a first lens group G1 having negative refractive power, a second lens group G2 having positive refractive power, a third lens group G3 having negative refractive power and a rear group having positive refractive power.

The rear group is composed of, in order from the object side, a fourth lens group G4 having positive refractive power, a fifth lens group G5 having negative refractive power and a sixth lens group G6 having positive refractive power, and has positive refractive power in an entire zooming range. Meanwhile, an aperture stop S is disposed between the fourth lens group G4 and the fifth lens group G5.

The first lens group G1 consists of, in order from the object side, a negative meniscus lens L11 having a convex surface facing the object side and a cemented lens constructed by a double concave negative lens L12 cemented with a positive meniscus lens L13 having a convex surface facing the object side. Meanwhile, the negative meniscus lens L11 is a glass lens, and an image side lens surface of the negative meniscus lens L11 is formed with an aspherical surface made of resin material.

The second lens group G2 consists of a positive meniscus lens L21 having a concave surface facing the object side.

The third lens group G3 consists of a negative meniscus lens L31 having a concave surface facing the object side.

The fourth lens group G4 consists of, in order from the object side, a double convex positive lens L41, a cemented lens constructed by a double convex positive lens L42 cemented with a negative meniscus lens L43 having a concave surface facing the object side and an aperture stop S.

The fifth lens group G5 consists of a cemented lens constructed by, in order from the object side, a positive meniscus lens L51 having a concave surface facing the object side cemented with a double concave negative lens L52.

The sixth lens group G6 consists of, in order from the object side, a negative meniscus lens L61 having a convex surface facing the object side and a positive meniscus lens L62 having a concave surface facing the object side. Meanwhile, the negative lens L61 is a plastic lens, of which an image side lens surface is an aspherical surface.

In the variable magnification optical system according to the present Example, upon varying magnification from the wide angle end state to the telephoto end state, the first to the sixth lens groups G1-G6 are moved along the optical axis such that an air interval between the first lens group G1 and the second lens group G2, an air interval between the second lens group G2 and the third lens group G3, an air interval between the third lens group G3 and the fourth lens group G4, an air interval between the fourth lens group G4 and the fifth lens group G5, and an air interval between the fifth lens group G5 and the sixth lens group G6 are varied. Meanwhile, upon varying magnification, the aperture stop S is moved together with the fourth lens group G4 in a body.

In the variable magnification optical system according to the present Example, focusing from an infinite distance object to a close distance object is carried out by moving the third lens group G3 along the optical axis toward the object side.

In the variable magnification optical system according to the present Example, vibration reduction is carried out by moving the second lens group G2 in a direction to have a component perpendicular to the optical axis.

Table 12 below shows various values of the variable magnification optical system according to the present Example.

TABLE 12

Twelfth Example

[Surface Data]

| m | r | d | nd | νd |
|---|---|---|---|---|
| OP | ∞ | | | |
| 1 | 56.24 | 2.00 | 1.69680 | 55.52 |
| 2 | 20.35 | 0.17 | 1.56093 | 36.64 |
| *3 | 18.69 | 9.97 | 1.00000 | |
| 4 | −2982.47 | 1.40 | 1.60300 | 65.44 |
| 5 | 18.31 | 5.00 | 1.84666 | 23.80 |
| 6 | 32.46 | variable | 1.00000 | |
| 7 | −620.57 | 1.63 | 1.48749 | 70.31 |
| 8 | −35.68 | variable | 1.00000 | |
| 9 | −25.12 | 0.80 | 1.77250 | 49.62 |
| 10 | −71.26 | variable | 1.00000 | |
| 11 | 54.96 | 2.89 | 1.60311 | 60.69 |
| 12 | −35.02 | 0.10 | 1.00000 | |
| 13 | 25.68 | 4.30 | 1.48749 | 70.31 |
| 14 | −23.22 | 0.80 | 1.84666 | 23.80 |
| 15 | −52.65 | 0.75 | 1.00000 | |
| 16(Stop S) | ∞ | variable | 1.00000 | |
| 17 | −45.18 | 2.27 | 1.84666 | 23.80 |
| 18 | −14.36 | 0.80 | 1.74950 | 35.25 |
| 19 | 41.64 | variable | 1.00000 | |
| 20 | 100.05 | 1.30 | 1.52444 | 56.21 |
| *21 | 80.01 | 1.54 | 1.00000 | |
| 22 | −416.31 | 2.37 | 1.48749 | 70.31 |
| 23 | −21.63 | Bf | 1.00000 | |
| Image plane | ∞ | | | |

[Aspherical Data]

| m | κ | A4 | A6 | A8 | A10 |
|---|---|---|---|---|---|
| 3 | 0.0000 | 1.09721E−05 | 2.63109E−08 | −3.94901E−11 | 1.79030E−13 |
| 21 | 0.0000 | 2.64794E−05 | 1.52619E−08 | 5.85840E−11 | −4.79996E−12 |

[Various Data]
Variable Magnification Ratio 2.89

| | W | M | T |
|---|---|---|---|
| f | 18.50 | 35.00 | 53.40 |
| FNO | 3.63 | 4.60 | 5.88 |
| 2ω | 80.59 | 45.83 | 30.72 |
| TL | 134.92 | 128.32 | 136.32 |
| Y | 14.25 | 14.25 | 14.25 |
| d6 | 34.40 | 11.79 | 3.56 |
| d8 | 5.58 | 6.27 | 6.52 |
| d10 | 2.36 | 1.87 | 1.82 |
| d15 | 1.70 | 5.48 | 9.09 |
| d19 | 8.98 | 5.00 | 1.20 |
| Bf | 43.82 | 59.84 | 76.07 |
| GRf | 30.86 | 28.39 | 25.84 |

[Lens Group Data]

| Group | Starting surface | f |
|---|---|---|
| 1 | 1 | −24.76 |
| 2 | 7 | 77.60 |
| 3 | 9 | −50.59 |
| 4 | 11 | 21.42 |
| 5 | 17 | −32.97 |
| 6 | 20 | 49.70 |

TABLE 12-continued

Twelfth Example

[Values for Conditional Expressions]

(1) (−fn)/fp = 0.7067
(2) fG1/f1 = 1.7
(3) f2/(−f3) = 1.5337

Figure 24A:
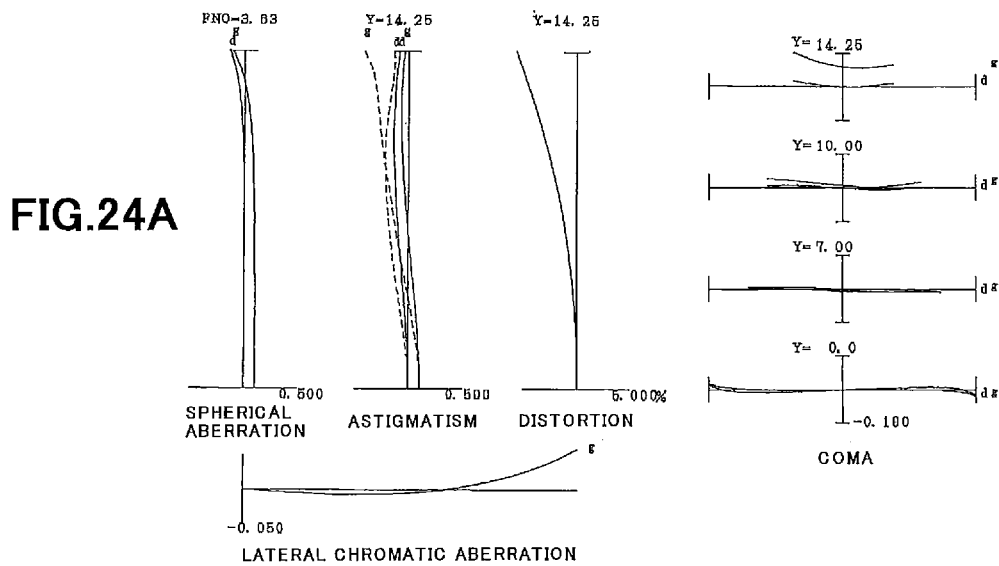
Figure 24B:
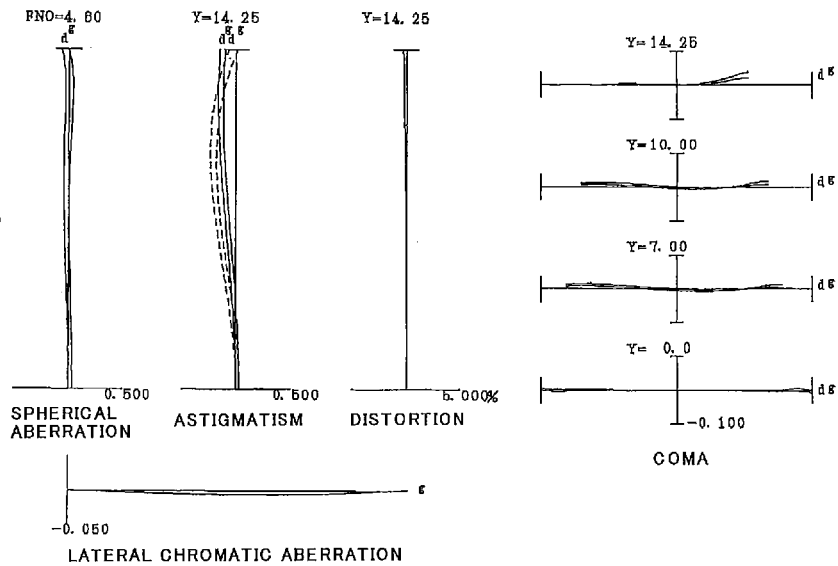
Figure 24C:
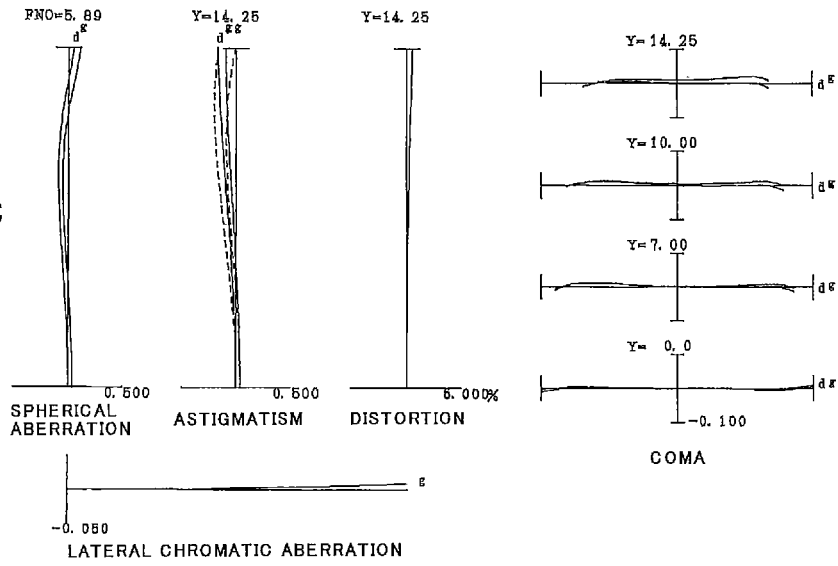

FIG. 24A, FIG. 24B and FIG. 24C are graphs showing various aberrations of the Twelfth Example according to the present embodiment upon focusing on an infinite distance object, in which FIG. 24A shows various aberrations in a wide angle end state, FIG. 24B shows various aberrations in an intermediate focal length state, and FIG. 24C shows various aberrations in a telephoto end state.

As is apparent from the respective graphs, the variable magnification optical system according to the present Example shows superb optical performance as a result of good corrections to various aberrations from the wide-angle end state to the telephoto end state.

As mentioned above, each of the above described Examples can realize a small-sized and light in weight variable magnification optical system having reduced variations in aberrations upon varying magnification and having excellent optical performance.

Incidentally, it is noted that each of the above described Examples is a concrete example of the present embodiment, and the present embodiment is not limited to them. The contents described below can be adopted without deteriorating optical performance of the variable magnification optical systems according to the present embodiment.

Although variable magnification optical systems each having any one of 4 to 7 group configurations were illustrated above as numerical examples of the variable magnification optical systems according to the present embodiment, the present embodiment is not limited to them and variable magnification optical systems having other configurations (for example, an 8 group configuration and the like) can be configured.

Concretely, a lens configuration that a lens or a lens group is added to the most object side or the most image side of the variable magnification optical system of each Example described above is possible. Further, the most image side lens group of said each example can be composed of two parts separated such that an interval therebetween being varied upon varying magnification.

Further, in the variable magnification optical system according to each Example described above, the respective lens groups are moved along the optical axis upon varying magnification from the wide angle end state to the telephoto end state. However, in the variable magnification optical system according to each Example described above, the position of at least one lens group, for example, the position of the most image side lens group may be fixed. Further, it is preferable that a trajectory of movement of the first lens group upon varying magnification from the wide angle end state to the telephoto end state, is in the shape of U such that the first lens group is at first moved toward the image side and then toward the object side. Furthermore, if the movement trajectories of the lens groups which are not neighboring to each other are made to be same, it is possible to link the plurality of the lens groups to move those lens groups in a body. By linking the plurality of the lens groups to move in a body, it becomes possible to simplify a lens group holing structure in a lens barrel, this contributing to attaining a small sized structure.

Further, in the variable magnification optical system according to each Example described above, intervals between the neighboring lens groups may be reduced further. By reducing further intervals between the neighboring lens groups, portability of the lens system may be improved. In the variable magnification optical system according to each Example described above, it is preferable that interval between the first lens group and the second lens group which is the largest, is reduced.

Further, in the variable magnification optical system according to each Example described above, a portion of any lens group, a lens group in the entirety thereof or a plurality of lens groups can be moved as a focusing lens group. In particular, it is desirable that, in a case where the variable magnification optical system according to each Example described above, has a five to seven group configuration, the third lens group is made to be a focusing lens group. Further, in a case where the variable magnification optical system according to each Example described above, has a four group configuration, it is desirable that at least a portion of the second lens group can be used for a focusing lens group. The focusing lens group can be used for auto focus, and suitable for being driven by a motor for auto focus such as an ultrasonic motor.

Further, in the variable magnification optical system according to each Example described above, any lens group in the entirety thereof or a portion thereof can be so moved, as a vibration reduction lens group, to have a component in a direction perpendicular to the optical axis, or rotationally moved (swayed) in an intra-plane direction including the optical axis to carry out vibration reduction. Particularly, in the variable magnification optical system according to each Example described above, it is preferable that at least a portion of the second lens group is used as a vibration reduction lens group. Meanwhile, in a case where the variable magnification optical system according to each Example described above has a five to seven lens group configuration, the fifth lens group may be used as a vibration lens group. Further, in a case where the variable magnification optical system according to each Example described above has a four lens group configuration, the third lens group may be used as a vibration lens group.

Further, the lens surface(s) of the lenses configuring the variable magnification optical system according to each Example described above, may be a spherical surface, a plane surface, or an aspherical surface. When a lens surface is an aspherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Further, in the variable magnification optical system according to each Example described above, it is preferable that an aperture stop is disposed between the second lens group and the third lens group, between the fourth lens group and the fifth lens group, or in the fourth lens group, and the function may be substituted by a lens frame without disposing a member as an aperture stop.

Moreover, the lens surface(s) of the lenses configuring the variable magnification optical system according to each Example described above, may be coated with anti-reflection coating(s) having a high transmittance in a broad wavelength range. With this contrivance, it is feasible to reduce a flare as well as ghost and attain a high optical performance with high contrast. In particular, it is preferable that, in the variable magnification optical system according to each Example described above, the object side lens surface(s) of the lenses in the most object side lens group is (are) coated with anti-reflection coating(s).

Next, a camera equipped with the variable magnification optical system according to the embodiment of the present application, will be explained with referring to FIG. 25.

Figure 25:
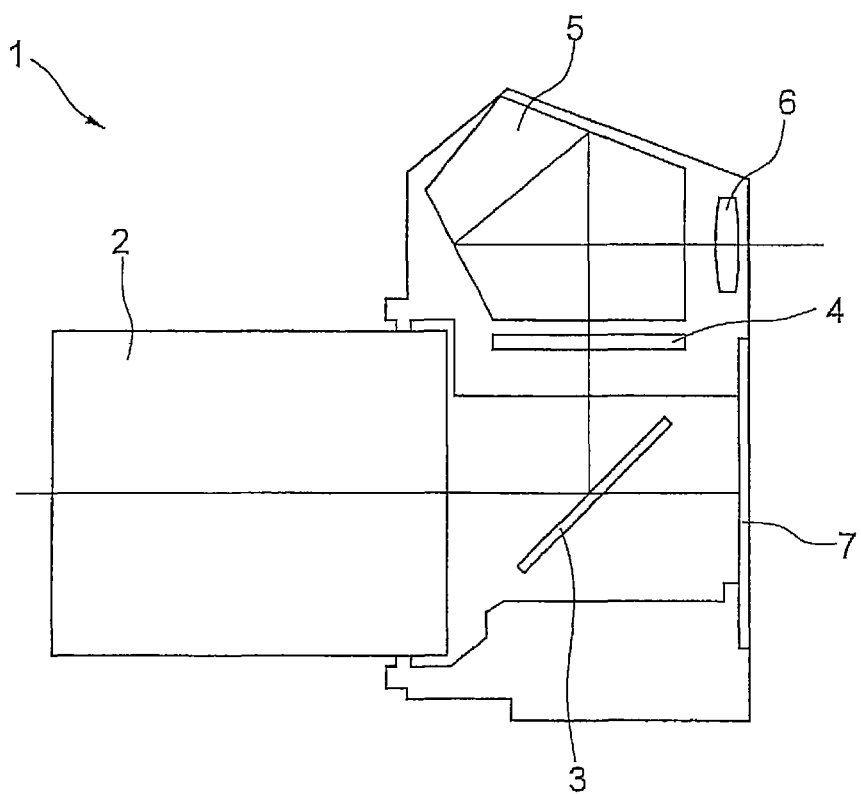
FIG. 25 is a diagram showing a configuration of a camera equipped with the variable magnification optical system.

FIG. 25 shows a configuration of a camera equipped with the variable magnification optical system according to the embodiment of the present application.

The present camera 1 is a lens changeable type single-lens reflex digital camera equipped with the variable magnification optical system according to the first Example as an imaging lens 2.

In the present camera 1, light emitted from an unillustrated object is converged by the imaging lens 2, reflected by a quick return mirror 3, and focused on a focusing screen 4. The light focused on the focusing screen 4 is reflected a plurality of times in a pentagonal roof prism 5, and is led to an eyepiece 6. Accordingly, a photographer can observe the object image as an erected image through the eyepiece 6.

When the photographer presses an unillustrated release button down, the quick return mirror 3 is retracted out of the optical path, and the light from the unillustrated object reaches an imaging device 7. Accordingly, the light emitted from the object is captured by the imaging device 7 and stored in an unillustrated memory as a photographed image of the object. In this manner, the photographer can take a picture of an object by the camera 1.

The variable magnification optical system according to the first Example installed as the imaging lens 2 in the camera 1, is compact and has excellent optical performance, as described above. In other words, it is possible to realize a camera 1 that is compact and has excellent optical performance. Incidentally, even if a variable magnification optical system according to each of the second to the fifth Examples is installed as an imaging lens 2 in a camera, the same effect as the camera 1 can be obtained. Further, even if a variable magnification optical system according to each of the above Examples is installed in a camera, which does not include a quick return mirror 3, the same effect as the above described camera 1 can be obtained.

Figure 26:
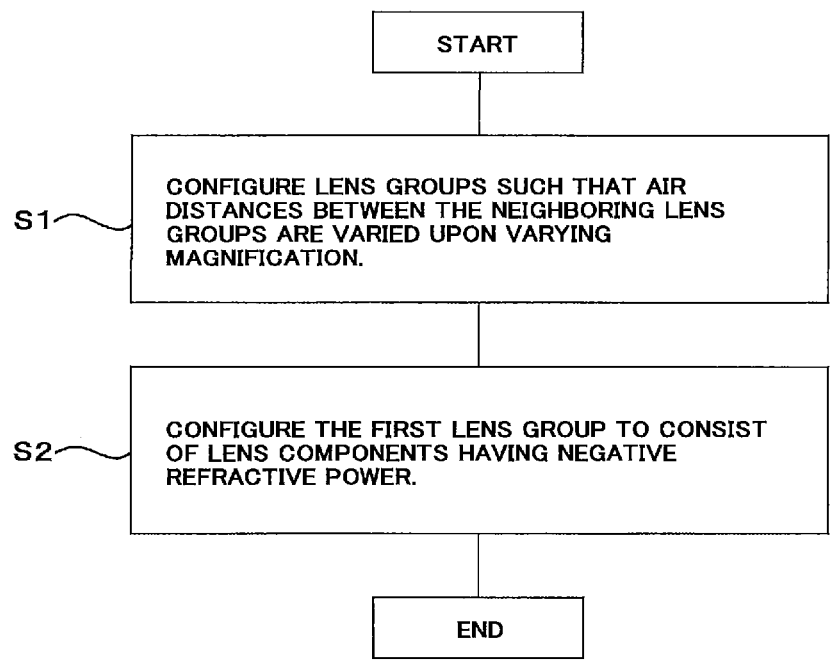
FIG. 26 is a schematic view showing a method for manufacturing the variable magnification optical system.

Finally, an outline of a method for manufacturing a variable magnification optical system according to the embodiment of the present application, is described with referring to FIG. 26.

FIG. 26 is a flowchart showing an outline of a method for manufacturing a variable magnification optical system according to the embodiment of the present application.

The method for manufacturing the variable magnification optical system according to the present embodiment shown in FIG. 26, is a method for manufacturing a variable magnification optical system comprising, in order from an object side: a first lens group having negative refractive power; a second lens group having positive refractive power; a third lens group having positive refractive power and a rear group which comprises at least one lens group and has positive refractive power as a whole; the method comprising the following steps S1 and S2:

Step 1: preparing the first to the third lens groups and the rear group, and disposing the respective lens groups in order from the object side in a lens barrel. Providing a known movement mechanism in the lens barrel such that air intervals between the neighboring lens groups are varied upon varying magnification.

Step 2: configuring such that the first lens group comprises lens components having negative refractive power.

According to such method for manufacturing a variable magnification optical system according to the embodiment of the present application, it is possible to manufacture a variable magnification optical system that is compact and has superb optical performance.

What is claimed is:

1. A variable magnification optical system comprises, in order from an object side, a first lens group having negative refractive power, a second lens group having positive refractive power, a third lens group having negative refractive power and a rear group comprising at least one lens group and having positive refractive power in the entirety thereof;

upon varying magnification, air intervals between the neighboring lens groups being varied, and the first lens group being moved;

said first lens group consisting of lens component(s) having negative refractive power;

a lens component disposed at the most object side of the first lens group being a negative meniscus lens component having a convex surface facing the object side; and the first lens group no including a catoptric element.

2. A variable magnification optical system according to claim 1, wherein the following conditional expression is satisfied:

$$1.00 < fG1/f1 < 3.00$$

where fG1 denotes a focal length of a most object side lens component in the first lens group, and f1 denotes a focal length of the first lens group.

3. A variable magnification optical system according to claim 1, wherein the following conditional expression is satisfied:

$$0.60 < f2/(-f3) < 2.00$$

where f2 denotes a focal length of the second lens group, and f3 denotes a focal length of the third lens group.

4. A variable magnification optical system according to claim 1, wherein the first lens group consists of a first lens component having negative refractive power and a second lens component having negative refractive power.

5. A variable magnification optical system according to claim 1, wherein
the first lens group comprises a first lens component having negative refractive power and a second lens component having negative refractive power, and
the second lens component consists of a cemented lens constructed by a negative lens cemented with a positive lens.

6. A variable magnification optical system according to claim 1, wherein
the first lens group comprises a first lens component having negative refractive power and a second lens component having negative refractive power, and
the first lens component is formed with an aspherical surface made of resin on an image side surface of a glass lens.

7. A variable magnification optical system according to claim 1, wherein
the following conditional expression is satisfied:

$$1.00<fN/f1<3.00$$

where fN denotes a focal length of a negative lens component having largest negative refractive power in the first lens group, and f1 denotes a focal length of the first lens group.

8. A variable magnification optical system according to claim 1, consisting of, in order from the object side, the first lens group having negative refractive power, the second lens group having positive refractive power, the third lens group having negative refractive power and a fourth lens group having positive refractive power.

9. A variable magnification optical system according to claim 1, consisting of, in order from the object side, the first lens group having negative refractive power, the second lens group having positive refractive power, the third lens group having negative refractive power, a fourth lens group having positive refractive power and a fifth lens group.

10. A variable magnification optical system according to claim 1, consisting of, in order from the object side, the first lens group having negative refractive power, the second lens group having positive refractive power, the third lens group having negative refractive power, a fourth lens group having positive refractive power, a fifth lens group having negative refractive power, and a sixth lens group having positive refractive power.

11. A variable magnification optical system according to claim 1, wherein
the rear group includes three or more lens groups;
upon varying magnification, air intervals between the neighboring lens groups included in the rear group are varied; and
upon varying magnification, at least one of air intervals included in the rear group and between lens groups which are not neighboring each other is not varied.

12. A variable magnification optical system according to claim 1, wherein at least one lens component in the second lens group is moved to have a component in a direction perpendicular to the optical axis.

13. An optical apparatus comprising the variable magnification optical system according to claim 1.

14. A variable magnification optical system according to claim 1, wherein
the first lens group comprises a cemented lens constructed by a negative lens cemented with a positive lens.

15. A variable magnification optical system according to claim 1, wherein
the first lens group includes one positive lens.

16. A variable magnification optical system according to claim 1, wherein
the first lens group consists of three or more lenses.

17. A variable magnification optical system according to claim 1, wherein
upon varying magnification, the first lens group is moved once toward an image side and then toward the object side.

18. A variable magnification optical system according to claim 1, wherein
upon varying magnification, the second lens group is moved toward the object side.

19. A variable magnification optical system according to claim 1, wherein
the first lens group comprises at least one negative lens and at least one positive lens, and
the following conditional expression is satisfied:

$$0.68<(-fn)/fp<1.00$$

where fn denotes a focal length of a most image side negative lens in the first lens group, and fp denotes a focal length of a most image side positive lens in the first lens group.

20. A variable magnification optical system according to claim 19, wherein
the following conditional expression is satisfied:

$$1.00<fG1/f1<3.00$$

where fG1 denotes a focal length of a most object side lens component in the first lens group, and f1 denotes a focal length of the first lens group.

21. A variable magnification optical system comprises, in order from an object side, a first lens group having negative refractive power, a second lens group having positive refractive power, a third lens group having negative refractive power and a rear group comprising at least one lens group and having positive refractive power in the entirety thereof;
upon varying magnification, air intervals between the neighboring lens groups being varied, and the first lens group being moved;
a lens group disposed at the most image side having positive refractive power;
a lens component disposed at the most object side of the first lens group being a negative meniscus lens having a convex surface facing the object side;
a lens component disposed at the most image side of the first lens group being a cemented lens constructed by as double concave negative lens cemented with a positive meniscus lens having a convex surface facing the object side; and
the first lens group not including a catoptric element.

22. A variable magnification optical system according to claim 21, wherein
the following conditional expression is satisfied:

$$1.00<fG1/f1<3.00$$

where fG1 denotes a focal length of a most object side lens component in the first lens group, and f1 denotes a focal length of the first lens group.

23. A variable magnification optical system according to claim 21, wherein
the following conditional expression is satisfied:

$$0.60<f2/(-f3)<2.00$$

where f2 denotes a focal length of the second lens group, and f3 denotes a focal length of the third lens group.

24. A method for manufacturing a variable magnification optical system comprising, in order from an object side, a first lens group having negative refractive power, a second lens group having positive refractive power, a third lens group having negative refractive power and a rear group which comprises at least one lens group and has positive refractive power as a whole, the method comprising:
- configuring such that, upon varying magnification, air intervals between the neighboring lens groups are varied,
- the method further comprising one or more of the following features (A) and (B):
- (A) configuring such that, upon varying magnification, the first lens group is moved;
- configuring such that, said first lens group consists of lens component(s) having negative refractive power;
- configuring such that, a lens component disposed at the most object side of the first lens group is a negative meniscus lens component having a convex surface facing the object side; and
- configuring such that, the first lens group does not include a catoptric element, and
- (B) configuring such that, upon varying magnification, the first lens group is moved;
- configuring such that, a lens group disposed at the most image side has positive refractive power;
- configuring such that, said first lens group consists of lens component(s) having negative refractive power;
- configuring such that, a lens component disposed at the most object side of the first lens group is a negative meniscus lens having a convex surface facing the object side; and
- configuring such that, a lens component disposed at the most image side of the first lens group is a cemented lens constructed by a double concave negative lens cemented with a positive meniscus lens a convex surface facing the object side; and
- configuring such that, the first lens group does not include a catoptric element.

* * * * *